US010911731B2

United States Patent
Hagiwara et al.

(10) Patent No.: US 10,911,731 B2
(45) Date of Patent: Feb. 2, 2021

(54) IMAGE-CAPTURING DEVICE

(71) Applicant: NIKON CORPORATION, Tokyo (JP)

(72) Inventors: Junya Hagiwara, Chigasaki (JP);
Yusuke Takanashi, Yokohama (JP);
Kiyoshige Shibazaki,
Higashimurayama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 15/715,999

(22) Filed: Sep. 26, 2017

(65) Prior Publication Data

US 2018/0020200 A1    Jan. 18, 2018

Related U.S. Application Data

(63) Continuation-in-part of application No. PCT/JP2016/060571, filed on Mar. 30, 2016.

(30) Foreign Application Priority Data

Mar. 31, 2015  (JP) ................. 2015-072660

(51) Int. Cl.
*H04N 9/64*     (2006.01)
*H04N 5/33*     (2006.01)
*H04N 9/04*     (2006.01)

(52) U.S. Cl.
CPC ............. *H04N 9/64* (2013.01); *H04N 5/33* (2013.01); *H04N 9/04* (2013.01)

(58) Field of Classification Search
CPC ............. H04N 9/04; H04N 9/64; H04N 5/33
(Continued)

(56) References Cited

U.S. PATENT DOCUMENTS 3,884,552 A  *  5/1975  Gerharz ............. G02B 23/12
                                                      359/292
4,343,020 A     8/1982  Stapleton
(Continued)

FOREIGN PATENT DOCUMENTS

JP    S57-48782 A    3/1982
JP    2002-171519 A  6/2002
(Continued)

OTHER PUBLICATIONS

M. Vilaseca et al., Color Visualization System for Near-Infrared Multispectral Images, 2004, CGIV, The Second European Conference on Colour Graphics, Imaging and Vision, pp. 431-436. (Year: 2004).*

(Continued)

*Primary Examiner* — Christopher S Kelley
*Assistant Examiner* — Kathleen M Walsh
(74) *Attorney, Agent, or Firm* — Oliff PLC

(57) ABSTRACT

Because conversion from an invisible wavelength band to a visible wavelength band has been performed arbitrarily on a device-by-device basis, the color gamut in the visible color space could not be utilized sufficiently. A first aspect of the present invention provides an image-capturing device including: an image-capturing unit that is photosensitive to light in an invisible band; a generating unit that generates invisible wavelength information defined based on a sensitivity characteristic, which is an output characteristic of the image-capturing unit, to an object light flux wavelength for conversion of image-capturing data generated from an output signal of the image-capturing unit into visible color space image data; and a processing unit that relates the invisible wavelength information to the image-capturing data.

20 Claims, 19 Drawing Sheets

(58) Field of Classification Search
USPC .......................................................... 348/164
See application file for complete search history.

(56) References Cited

U.S. PATENT DOCUMENTS

| | | | |
|---|---|---|---|
| 4,418,359 A | 11/1983 | Stapleton | |
| 8,724,894 B1* | 5/2014 | Jensen | H04N 1/646 |
| | | | 382/162 |
| 8,941,678 B2* | 1/2015 | Kurtz | H04N 9/3182 |
| | | | 345/590 |
| 9,425,227 B1* | 8/2016 | Wang | H01L 27/14621 |
| 2005/0182328 A1* | 8/2005 | Matsumoto | G01N 21/25 |
| | | | 600/476 |
| 2006/0071156 A1* | 4/2006 | Masaki | H01L 27/14649 |
| | | | 250/226 |
| 2008/0203305 A1* | 8/2008 | Suzuki | H04N 9/04559 |
| | | | 250/338.1 |
| 2009/0009621 A1* | 1/2009 | Yamaguchi | H04N 5/33 |
| | | | 348/222.1 |
| 2009/0012405 A1 | 1/2009 | Hasegawa et al. | |
| 2011/0102563 A1* | 5/2011 | Johnson, Jr. | H04N 13/334 |
| | | | 348/60 |
| 2011/0228097 A1* | 9/2011 | Motta | H04N 5/33 |
| | | | 348/164 |
| 2011/0309755 A1* | 12/2011 | Wirth | H05B 45/20 |
| | | | 315/151 |
| 2013/0141574 A1* | 6/2013 | Dalal | G06K 9/2018 |
| | | | 348/148 |
| 2015/0062347 A1* | 3/2015 | Jin | H04N 9/0451 |
| | | | 348/164 |

FOREIGN PATENT DOCUMENTS

| | | | | |
|---|---|---|---|---|
| JP | 2004-077143 A | | 3/2004 | |
| JP | 2006-109120 A | | 4/2006 | |
| JP | 2007-174126 A | | 7/2007 | |
| JP | 2007174126 A | * | 7/2007 | |
| JP | 2015053578 A | * | 3/2015 | |
| WO | 2007-083437 A1 | | 7/2007 | |
| WO | WO-2009098968 A1 | * | 8/2009 | ........... H04N 1/6086 |

OTHER PUBLICATIONS

Jun. 21, 2016 International Search Report issued in International Patent Application No. PCT/JP2016/060571.

* cited by examiner (a)

| IMAGE-CAPTURING SYSTEM COLOR SPACE INFORMATION | |
|---|---|
| LIGHT SOURCE CHARACTERISTIC | HALOGEN LIGHT |
| PEAK WAVELENGTH λa | 1150nm |
| PEAK WAVELENGTH λb | 1400nm |
| PEAK WAVELENGTH λc | 1650nm |
| PRIMARY STIMULUS VALUE 1 (VERTEX AB) | 0.17,0.20 |
| PRIMARY STIMULUS VALUE 2 (VERTEX CD) | 0.13,0.65 |
| PRIMARY STIMULUS VALUE 3 (VERTEX EF) | 0.63,0.35 |
| REFERENCE POINT ReFP | 0.33,0.33 |
| BRIGHTNESS CORRECTION | γ=1 |
| COLOR PROCESSING | SEPARATE WATER AND OIL |
| DISPLAY COLOR SPACE | sRGB |
| LOWER LIMIT VALUE OF TARGET BAND | 850nm |
| UPPER LIMIT VALUE OF TARGET BAND | 1950nm |
| CORRESPONDING PRIMARY STIMULUS VALUE 1 (VERTEX GH) | (0.14,0.06) |
| CORRESPONDING PRIMARY STIMULUS VALUE 2 (VERTEX IJ) | (0.20,0.68) |
| CORRESPONDING PRIMARY STIMULUS VALUE 3 (VERTEX KL) | (0.63,0.32) |

(b)

| IMAGE-CAPTURING SYSTEM COLOR SPACE INFORMATION | |
|---|---|
| LIGHT SOURCE CHARACTERISTIC | HALOGEN LIGHT |
| PEAK WAVELENGTH λa | 1150nm |
| PEAK WAVELENGTH λb | 1400nm |
| PEAK WAVELENGTH λc | 1650nm |
| PRIMARY STIMULUS VALUE 2 (VERTEX CD) | 0.13,0.65 |
| PRIMARY STIMULUS VALUE 1 (VERTEX AB) | 0.17,0.20 |
| PRIMARY STIMULUS VALUE 3 (VERTEX EF) | 0.63,0.35 |
| REFERENCE POINT ReFP | 0.33,0.33 |
| BRIGHTNESS CORRECTION | γ=1 |
| COLOR PROCESSING | SEPARATE WATER AND OIL |
| DISPLAY COLOR SPACE | sRGB |
| LOWER LIMIT VALUE OF TARGET BAND | 850nm |
| UPPER LIMIT VALUE OF TARGET BAND | 1950nm |

FIG. 12

IMAGE-CAPTURING DEVICE

The contents of the following Japanese and International patent applications are incorporated herein by reference:
NO. 2015-72660 filed on Mar. 31, 2015, and
NO. PCT/JP2016/060571 filed on Mar. 30, 2016.

BACKGROUND

1. Technical Field

The present invention relates to an image-capturing device.

2. Related Art

An image-capturing system that allocates the visible three primary colors (RGB) to invisible three wavelength bands having mutually different central wavelengths, respectively, has been known.

PRIOR ART DOCUMENT

Patent Document

[Patent Document 1] WO2007/083437
Because conversion from an invisible wavelength band into a visible wavelength band has been performed arbitrarily on a device-by-device basis, the color gamut in the visible color space could not be utilized sufficiently.

SUMMARY

One aspect of the present invention provides an image-capturing device including: an image-capturing unit that is photosensitive to light in an invisible band; a generating unit that generates invisible wavelength information defined based on a sensitivity characteristic, which is an output characteristic of the image-capturing unit, to an object light flux wavelength for conversion of image-capturing data generated from an output signal of the image-capturing unit into visible color space image data; and a processing unit that relates the invisible wavelength information to the image-capturing data.

The summary clause does not necessarily describe all necessary features of the embodiments of the present invention. The present invention may also be a sub-combination of the features described above.

BRIEF DESCRIPTION OF THE DRAWINGS

FIG. 12 is a figure showing one example of image-capturing system color space information.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
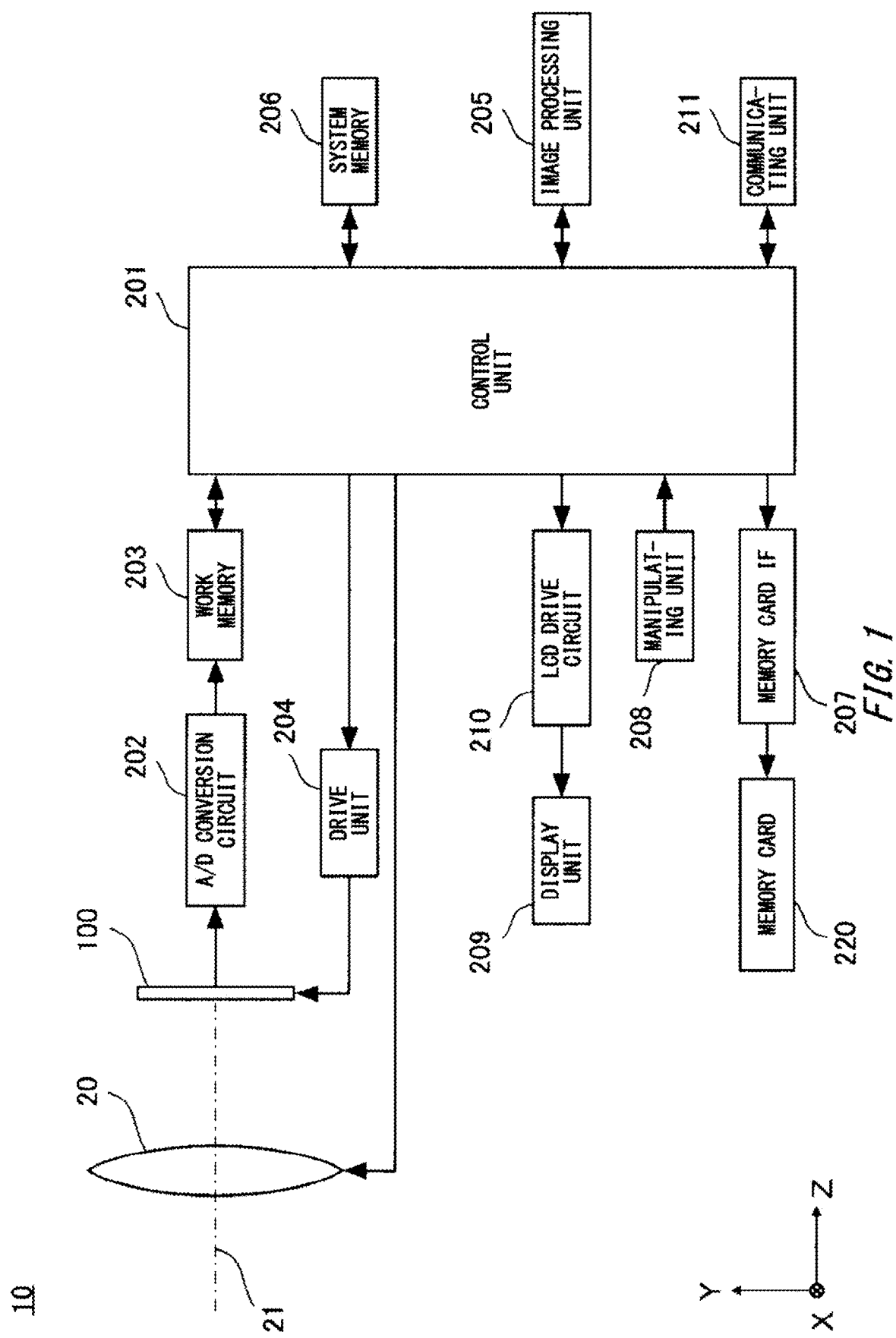
FIG. 1 is a figure for explaining a configuration of a digital camera.

FIG. 1 is a figure for explaining a configuration of a digital camera 10 as one example of an image-capturing device according to the present embodiment. The digital camera 10 is an image-capturing device that captures an image of an invisible band object light flux. The digital camera 10 includes a taking lens 20 as a photographing optical system, and an image sensor 100. The taking lens 20 guides, to the image sensor 100, an object light flux that enters along an optical axis 21. In addition to the taking lens 20 and the image sensor 100, the digital camera 10 includes a control unit 201, an A/D conversion circuit 202, a work memory 203, a drive unit 204, an image processing unit 205, a system memory 206, a memory card IF 207, a manipulating unit 208, a display unit 209, an LCD drive circuit 210 and a communicating unit 211.

As illustrated in the figure, the direction parallel with the optical axis 21 that points to the image sensor 100 is determined as the Z-axis positive direction, the direction that points into the paper surface on a plane orthogonal to the Z-axis is determined as the X-axis positive direction, and the direction that points upward on the paper surface is defined as the Y-axis positive direction. Regarding a relationship with the composition in photographing, the X-axis becomes the horizontal direction, and the Y-axis becomes the vertical direction. In some of the figures that follow, coordinate axes are displayed with the coordinate axes of FIG. 1 being used as the reference so that the orientation of each figure can be known.

The taking lens 20 is configured with a plurality of optical lens groups, and forms an image of an object light flux from a scene in the proximity of its focal plane. The taking lens

20 may be a replaceable lens that can be attached to and detached from the digital camera 10. In this case, the camera body functions as an image-capturing device. For convenience of explanation, in FIG. 1, the taking lens 20 is representatively represented with a single virtual lens arranged in the proximity of the pupil.

The image sensor 100 is arranged in the proximity of the focal plane of the taking lens 20. The image sensor 100 is an infrared image sensor photosensitive to light in an invisible band. In the present embodiment, as one example of it, the image sensor 100 is photosensitive to light in the range of 800 nm to 2000 nm in the near infrared band of 800 nm to 2500 nm. These near infrared band and range of photosensitivity are not limited to those in the present example.

The image sensor 100 includes a plurality of pixels arrayed two-dimensionally. Each one among the plurality of pixels includes a photoelectric converting unit, and a bandpass filter provided corresponding to the photoelectric converting unit. As described in detail below, in the present embodiment, there are three types of bandpass filter, and each one among the plurality of photoelectric converting units is provided with one of the bandpass filters.

The image sensor 100 is timing-controlled by the drive unit 204 to convert an object image formed on its light receiving surface into a pixel signal and output it to the A/D conversion circuit 202. The A/D conversion circuit 202 converts the pixel signal as an output signal output by the image sensor 100 into a digital signal. It outputs image-capturing data obtained by the digital conversion to the work memory 203.

The control unit 201 plays a role as a generating unit that generates infrared wavelength information as one example of invisible wavelength information for converting image-capturing data generated from the output signal of the image sensor 100 into visible color space image data. The visible color space shows a range of colors that a predetermined color coordinate system can handle. In other words, because it shows a range of colors that a color coordinate system can handle, the visible color space is in some cases referred to as a display system color space in the present specification. As described in detail below, the infrared wavelength information is defined based on the sensitivity characteristic which is the output characteristic of the image sensor 100 to an object light flux wavelength.

The image processing unit 205 performs various types of processing such as brightness correction processing on image-capturing data using the work memory 203 as a workspace. Also, the image processing unit 205 plays a role as a processing unit that relates infrared wavelength information as tag information to the image-capturing data that has undergone the various types of processing. An image-capturing file in which the image-capturing data and the infrared wavelength information are related to each other is recorded in a memory card 220 attached to the memory card IF 207.

The control unit 201 and the image processing unit 205 cooperate with each other to convert the image-capturing data into visible color space image data using the infrared wavelength information. Details of conversion are described below.

The image processing unit 205 can convert infrared wavelength band-based image-capturing data into visible wavelength band-based image data to generate the image data by allocating mutually different visible bands to respective wavelength bands of three types of bandpass filter.

The generated image data is converted into a display signal by the LCD drive circuit 210, and displayed on the display unit 209. As described in detail below, even objects that are difficult to color-discriminate in a visible wavelength band-based image, like water and oil for example, can be color-discriminated in an infrared wavelength band-based image. A menu screen for various types of setting is also displayed on the display unit 209. For example, a menu screen related to setting of a reference point described below is displayed. Also, the generated image data is recorded in the memory card 220 attached to the memory card IF 207.

The system memory 206 records a program to control the digital camera 10, various types of parameter and the like. In the present embodiment, an image-capturing parameter is stored. The image-capturing parameter includes information indicative of a light source characteristic, information indicative of transmittances of three types of bandpass filter, information indicative of the photosensitivity of the image sensor 100 and the like. The information indicative of transmittance may be stored as a table in which transmittances are respectively associated with wavelength bands of constant intervals, or may be stored as a function for calculating a transmittance corresponding to a wavelength band.

The manipulating unit 208 accepts a manipulation of a user to output a manipulation signal corresponding to the manipulation to the control unit 201. For example, if a menu screen related to setting of a reference point is displayed on the display unit 209, it outputs a manipulation signal related to the setting of the reference point to the control unit 201 according to the manipulation. A user can select a method of setting a reference point or the like through the manipulating unit 208.

Also, the manipulating unit 208 includes manipulating member such as a release switch, a cross-key or an OK key. The release switch is configured with a press-button that can sense manipulations at two steps in its pressing direction. The control unit 201 performs AF, AE and the like which are photographing preparatory operations by sensing SW1 which is a first step pressing, and performs an object image acquiring operation by the image sensor 100 by sensing SW2 which is a second step pressing. In the present embodiment, AF is performed so that an object image is focused in the infrared wavelength band.

The communicating unit 211 communicates with another device. The communicating unit 211 transmits an image-capturing file to the other device according to a manipulation by a user through the manipulating unit 208. Examples of the other device include a device provided with a display unit such as a personal computer, a smartphone or a tablet, and a server device on the Internet, and the like.

A series of photographing sequences is started upon the manipulating unit 208 accepting a manipulation by a user and outputting a manipulation signal to the control unit 201.

Figure 2:
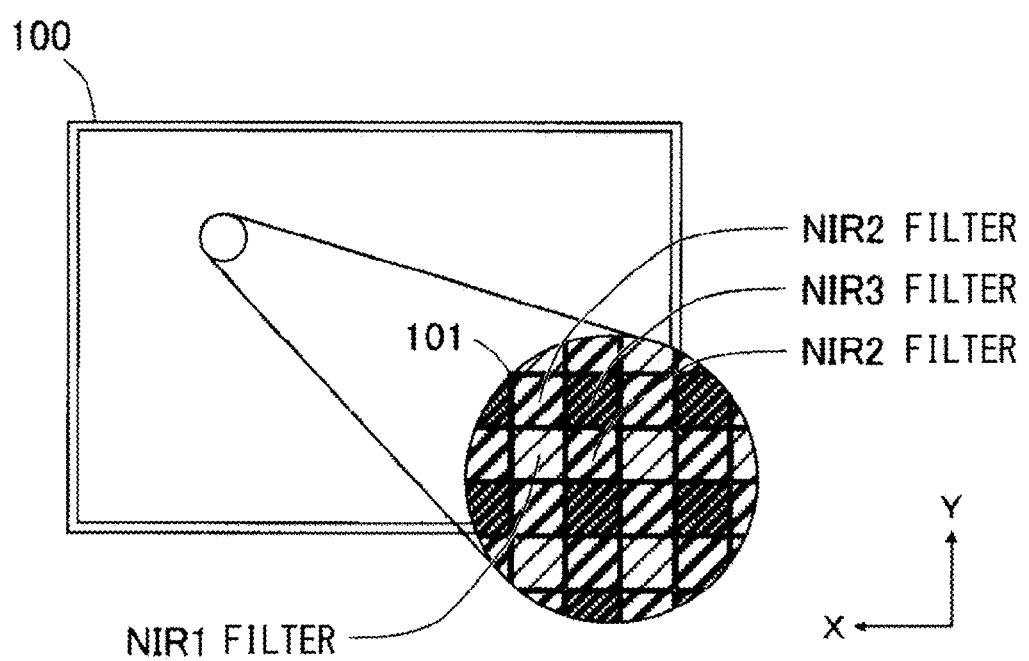
FIG. 2 is a figure for explaining a bandpass filter arranged on each photoelectric converting unit of an image sensor.

FIG. 2 is an explanatory figure for a bandpass filter arranged on each photoelectric converting unit of the image sensor 100. Each one among the three types of bandpass filter allows part of continuous near infrared bands in an object light flux to pass therethrough. The band passage of which is allowed is mutually different among the three types of bandpass filter. As illustrated in the figure, in the present embodiment, a NIR1 filter, a NIR2 filter and a NIR3 filter are provided as the three types of bandpass filter. The NIR1 filter, the NIR2 filters and the NIR3 filter are allocated like a Bayer array for four pixels 101 consisting of two pixels× two pixels. In more detail, the NIR2 filters are allocated to two upper left and lower right pixels, the NIR1 filter is allocated to one lower left pixel and the NIR3 filter is allocated to one upper right pixel. The arrangement of the bandpass filters is not limited to that in the present example.

In the image sensor 100 as a whole, each one among a plurality of pixels arrayed two-dimensionally is provided discretely with any of the NIR1 filter, the NIR2 filter and the NIR3 filter. Accordingly, it can be said that the image sensor 100 detects an incoming object light flux while separating it into respective wavelength bands. In other words, the image sensor 100 performs photoelectric conversion while separating an object image formed on its light receiving surface into three wavelength bands that are in the infrared band and are mutually different.

Figure 3:
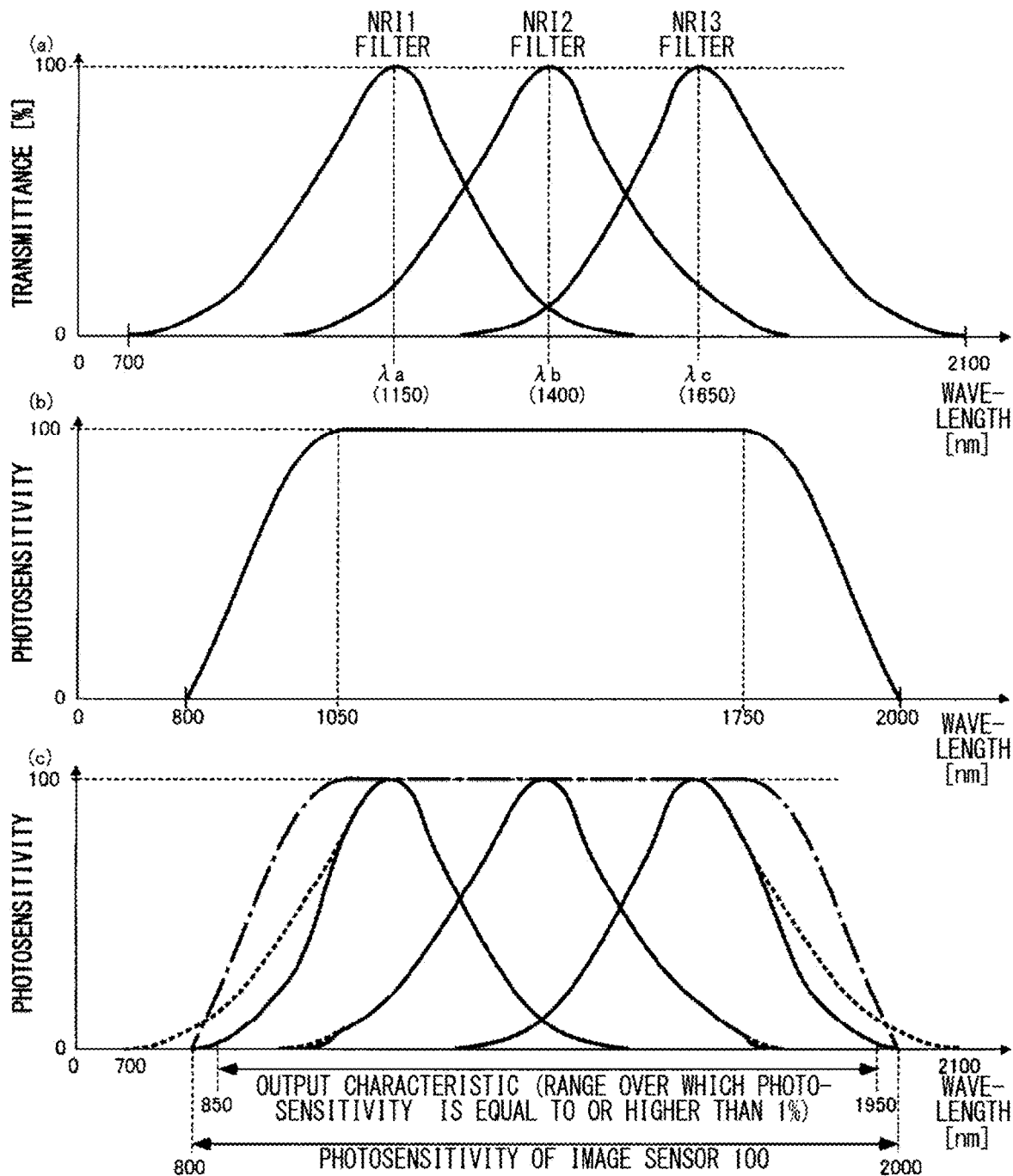
FIG. 3 is a figure for explaining an output characteristic of an image sensor.

FIG. 3 is a figure for explaining an output characteristic of the image sensor 100. (a) of FIG. 3 is a figure for explaining bandpass filters. The horizontal axis indicates wavelength [nm], and the vertical axis indicates transmittance [%]. (b) of FIG. 3 is a figure for explaining the photosensitivity of the image sensor 100. The horizontal axis indicates wavelength [nm], and the vertical axis indicates photosensitivity. Here, the photosensitivity is normalized assuming that the photosensitivity for the highest sensitivity wavelength is 100. In order to simplify the explanation, the conversion efficiency is assumed as being 100% if the photosensitivity is 100. (c) of FIG. 3 is a figure showing an output characteristic determined by the photosensitivities of the bandpass filters and the image sensor 100. The horizontal axis indicates wavelength [nm], and the vertical axis indicates photosensitivity. The broken lines indicate the transmittance distributions of the NIR1 filter, the NIR2 filter and the NIR3 filter, and the chain line indicates the photosensitivity distribution of the image sensor 100. The solid lines indicate the sensitivity distributions of output characteristics.

As shown in (a) of FIG. 3, the respective transmittance distribution shapes of the NIR1 filter, the NIR2 filter and the NIR3 filter are approximately the same overall. In more detail, the NIR1 filter is transmissive to about 700 nm to about 1550 nm, and the peak wavelength λa of the NIR1 filter is 1150 nm. The NIR2 filter is transmissive to about 950 nm to about 1800 nm, and the peak wavelength λb of the NIR2 filter is 1400 nm. The NIR3 filter is transmissive to about 1250 nm to about 2100 nm, and the peak wavelength λc of the NIR3 filter is 1650 nm.

Each of the NIR1 filter, the NIR2 filter and the NIR3 filter is transmissive to the peak wavelengths of the other band filters. Specifically, the NIR1 filter is transmissive to the peak wavelength of the NIR2 filter. Likewise, the NIR3 filter is transmissive to the peak wavelength of the NIR2 filter. Also, the NIR2 filter is transmissive to the respective peak wavelengths of the NIR1 filter and the NIR3 filter.

As shown in (b) of FIG. 3, the image sensor 100 is photosensitive to light in the wavelength band of about 800 nm to about 2000 nm. In more detail, the photosensitivity rapidly increases in the wavelength band of about 800 nm to the about 1050 nm. The photosensitivity is 100 in the range of about 1050 nm to about 1750 nm. The photosensitivity rapidly decreases in the range of about 1750 nm to about 2000 nm.

Here, the output characteristic of the image sensor 100 is calculated by multiplication of the transmittances of bandpass filters and the photosensitivity of the image sensor 100. In the present embodiment, the output characteristic of the image sensor 100 is defined as a range over which the image sensor 100 has a photosensitivity equal to or higher than a predetermined threshold (for example, 1%) in the photosensitivity calculated by multiplication.

As shown in (c) of FIG. 3, because in the range of about 1050 nm to about 1750 nm, the photosensitivity of the image sensor 100 is 100, the transmittances of the NIR1 filter, the NIR2 filter and the NIR3 filter are an output characteristic as is. On the other hand, because in the range of about 800 nm to about 1050 nm and the range of about 1750 nm to about 2000 nm, the photosensitivity of the image sensor 100 is not 100, the transmittances of the NIR1 filter, the NIR2 filter and the NIR3 filter are not an output characteristic as is. In the range of about 800 nm to about 1050 nm, the output characteristic is calculated by multiplying the respective transmittances of the NIR1 filter and the NIR2 filter by the photosensitivity of the image sensor 100. Likewise, in the range of about 1750 nm to about 2000 nm, it is calculated by multiplying the respective transmittances of the NIR2 filter and the NIR3 filter by the photosensitivity of the image sensor 100. As a result, the lower limit value of the output characteristic is 850 nm, and its upper limit value is 1950 nm.

Figure 4:
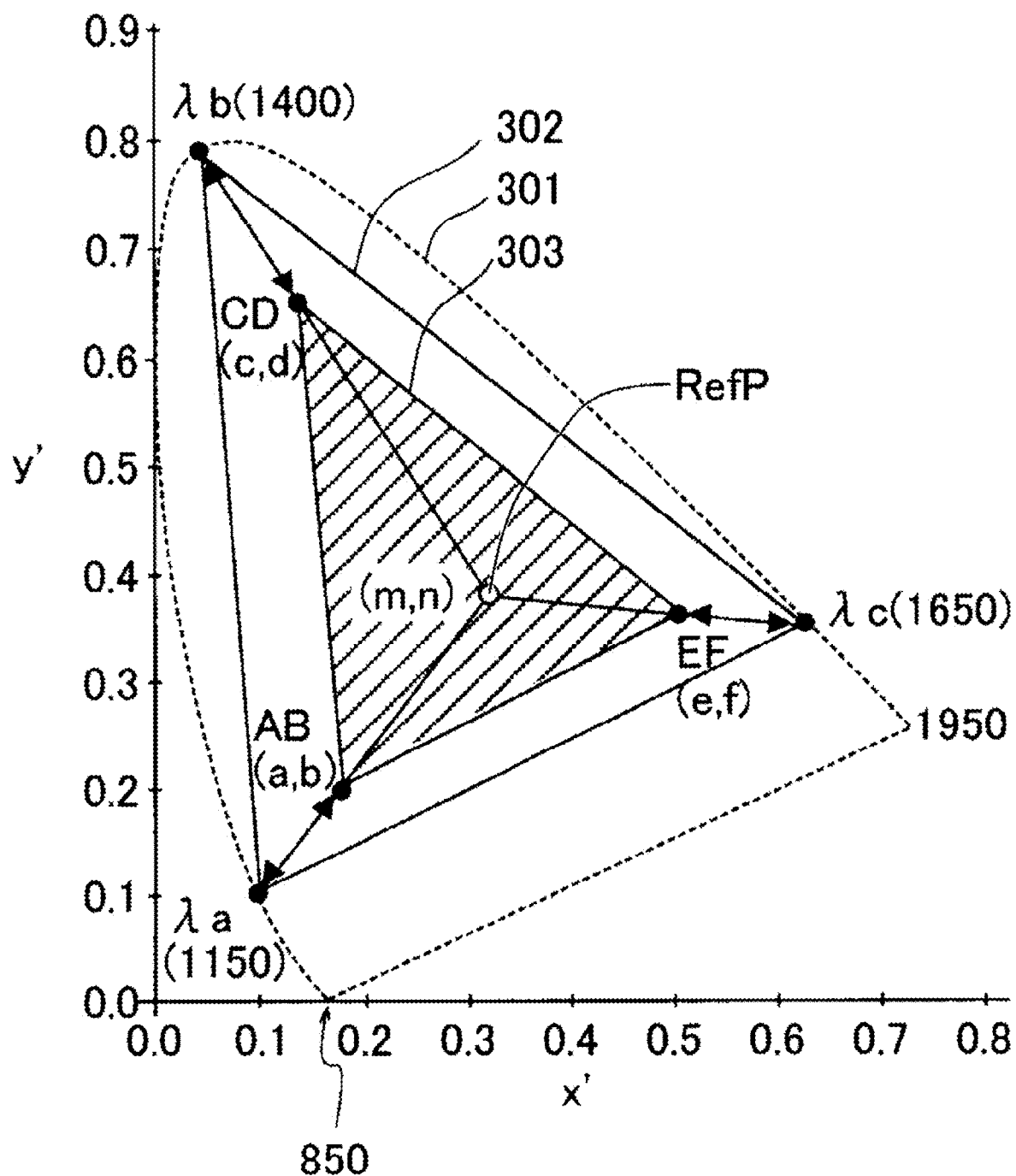
FIG. 4 is a figure for explaining a space defined by an output characteristic of an image sensor.

FIG. 4 is a figure for explaining a space defined by the output characteristic of the image sensor 100. In the present embodiment, a virtual color coordinate system corresponding to a visible CIE color coordinate system is defined in order to handle the range of the output characteristic, that is, the invisible wavelength band in a similar manner to the visible wavelength band. Specifically, a region 301 defined by the lower limit value and upper limit value of the output characteristic (a region surrounded by the dotted line) is defined as a region corresponding to a visible region in a chromaticity diagram described below. That is, the curved part of the region 301 is defined by continuous wavelengths from the lower limit value, 850 nm, to the upper limit value, 1950 nm. Because the visible region is generally expressed with a horseshoe shape, the region 301 can be made correspond to the entire visible region by shaping the region 301 into a similar figure to the visible region. By defining the region 301 in this manner, if the region 301 is converted into the visible region as described below, the entire region 301 can be included in the visible region, and the entire visible region can be utilized. FIG. 4 illustrates x', y' corresponding to a chromaticity coordinate, x, y as coordinate axes. The horizontal axis is x', and the vertical axis is y'. Although in the present embodiment, the region 301 is expressed in a horseshoe shape in imitation of the visible region, the shape is not limited to a horseshoe shape. The region 301 may have any shape as long as it includes a triangle indicated by a region 303 described below.

If the region 301 is defined, a coordinate (m, n) of a reference point RefP is set subsequently. As described in detail below, in the present embodiment, the coordinate (m, n) of the reference point RefP is set, as a default position, at a position corresponding to a reference white described below. If the lower limit value, the upper limit value and the reference point RefP are determined, a relationship between the reference point RefP and a wavelength at each point of the curved part of the region 301 is determined so as to set the coordinate (m, n) of the reference point RefP to (0.33, 0.33). That is, the coordinates of the peak wavelength λa, the peak wavelength λb and the peak wavelength λc are uniquely determined.

A region 302 is a region formed by linking, with straight lines, the respective points of the peak wavelength λa, the peak wavelength λb and the peak wavelength λc. The region 302 is larger than a region indicated by a region 303 described below.

The region 303 is a region formed by linking, with straight lines, a point AB on a straight line linking the peak wavelength λa and the reference point RefP, a point CD on a straight line linking the peak wavelength λb and the reference point RefP and a point EF on a straight line linking the peak wavelength λc and the reference point RefP. The region 303 indicates a color space that is actually reproducible. Although because the region 303 is a region of the infrared wavelength band, it is actually a region that cannot be visually recognized in colors, it is referred as a color space for convenience of explanation in the present specification. In the present specification, the region 303 is referred to as an image-capturing system color space as a space corresponding to the display system color space. Also, the region 303 is in some cases referred to as a virtual color space in a corresponding manner to the visible color space. In the image-capturing system color space, an infrared wavelength band passage of which each bandpass filter has allowed is expressed by a combination of numerical values. The region 303 is determined by the transmittance distribution of each bandpass filter.

If the coordinate (m, n) of the reference point RefP is set, a display resolution is determined. In other words, distances from the respective points of the peak wavelength λa, the peak wavelength kb and the peak wavelength λc to respective corresponding vertexes of the region 303 are determined. That is, the coordinate (a, b) of the point AB, the coordinate (c, d) of the point CD and the coordinate (e, f) of the point EF are determined. Thereby, the area of the region 303, that is, the color-saturation, is determined.

Figure 5:
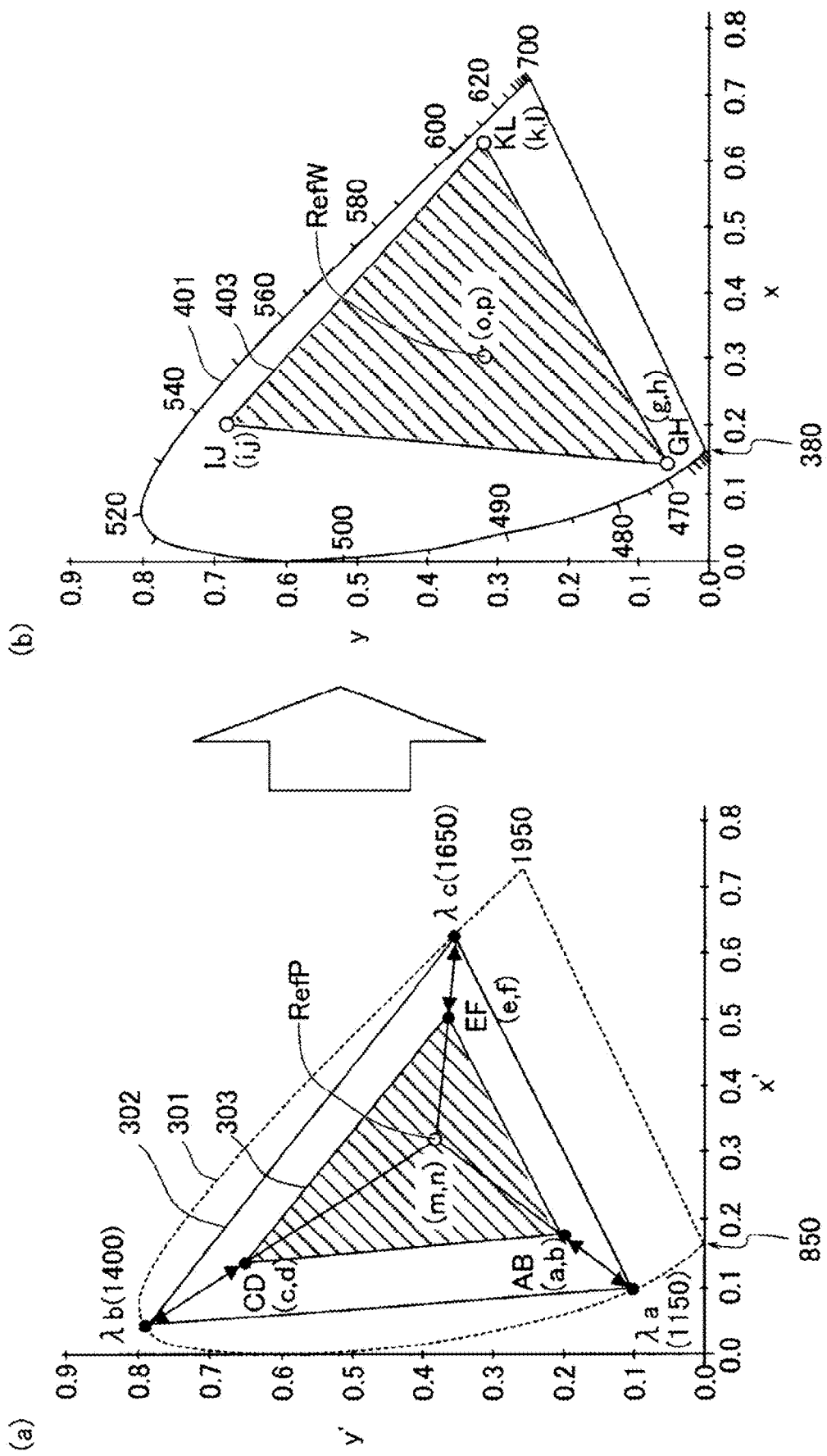
FIG. 5 is a figure for explaining a correspondence between an image-capturing system color space and a display system color space.

FIG. 5 is a figure for explaining a correspondence between an image-capturing system color space and a display system color space. (a) of FIG. 5 is the same as FIG. 4. (b) of FIG. 5 shows a visible color coordinate system chromaticity diagram. The horizontal axis is x, and the vertical axis is y.

As mentioned above, the region 301 in (a) of FIG. 5 is associated with a region 401 indicating a visible region in (b) of FIG. 5. Specifically, 850 nm which is the lower limit value of the region 301 and 380 nm which is the lower limit value of the region 401 are associated with each other, and 1950 nm which is the upper limit value of the region 301 and 700 nm which is the upper limit value of the region 401 are associated with each other. The widths between wavelengths of respective points on the curved part of the region 401 in (b) of FIG. 5 are not constant. The relationship between the reference white RefW and the wavelengths of the respective points on the curved part of the region 401 is determined to set the coordinate (o, p) of the reference white RefW to (0.33, 0.33). Specifically, the widths between wavelengths are set to be small in the range of 380 nm to 470 nm, large in the range of 470 nm to 620 nm, and small in the range of 620 nm to 700 nm. Likewise, the widths between wavelengths of respective points in the curved part of the region 301 in (a) of FIG. 5 are set to be small around the lower limit value and around the upper limit value, and large in the other portions. Because the lower limit value and upper limit value of the region 401 are determined corresponding to the human visual characteristics, and thus are fixed. On the other hand, as described in detail below, the lower limit value and upper limit value of the region 301 are in the infrared wavelength band, determined irrespective of the human visual characteristics, and thus are variable.

In the present embodiment, the coordinate (m, n) of the reference point RefP is associated with the coordinate (o, p) of the reference white RefW as a particular coordinate. The region 303 in (a) of FIG. 5 (that is, the virtual color space) is associated with a region 403 in (b) of FIG. 5 (that is, the visible color space). Specifically, the coordinate (a, b) of the vertex AB is associated with the coordinate (g, h) of the vertex GH. That is, coordinates around the coordinate (a, b) of the vertex AB are associated with bluish colors. The coordinate (c, d) of the vertex CD is associated with the coordinate (i, j) of the vertex IJ. That is, coordinates around the coordinate (c, d) of the vertex CD are associated with greenish colors. The coordinate (e, f) of the vertex EF is associated with the coordinate (k, l) of the vertex KL. That is, coordinates around the coordinate (e, f) of the vertex EF are associated with reddish colors. If coordinates representing an object are mapped to the region 303, the coordinates can be converted into coordinates in the region 403. That is, they can be converted into visible colors. Because the vertex AB of the region 303 is positioned on a line between the reference point RefP and the peak wavelength λa, the proportion of a straight line linking the peak wavelength λa and the vertex AB to a straight line linking the reference point RefP and the peak wavelength λa is determined. It can be expressed at a similar proportion also in the visible color coordinate system chromaticity diagram. That is, if the vertex AB of the region 303 and the peak wavelength λa are determined, the coordinate (g, h) of the vertex GH can be determined. Likewise, the coordinate (i, j) of the vertex IJ and the coordinate (k, l) of the vertex KL can be determined.

Figure 6:
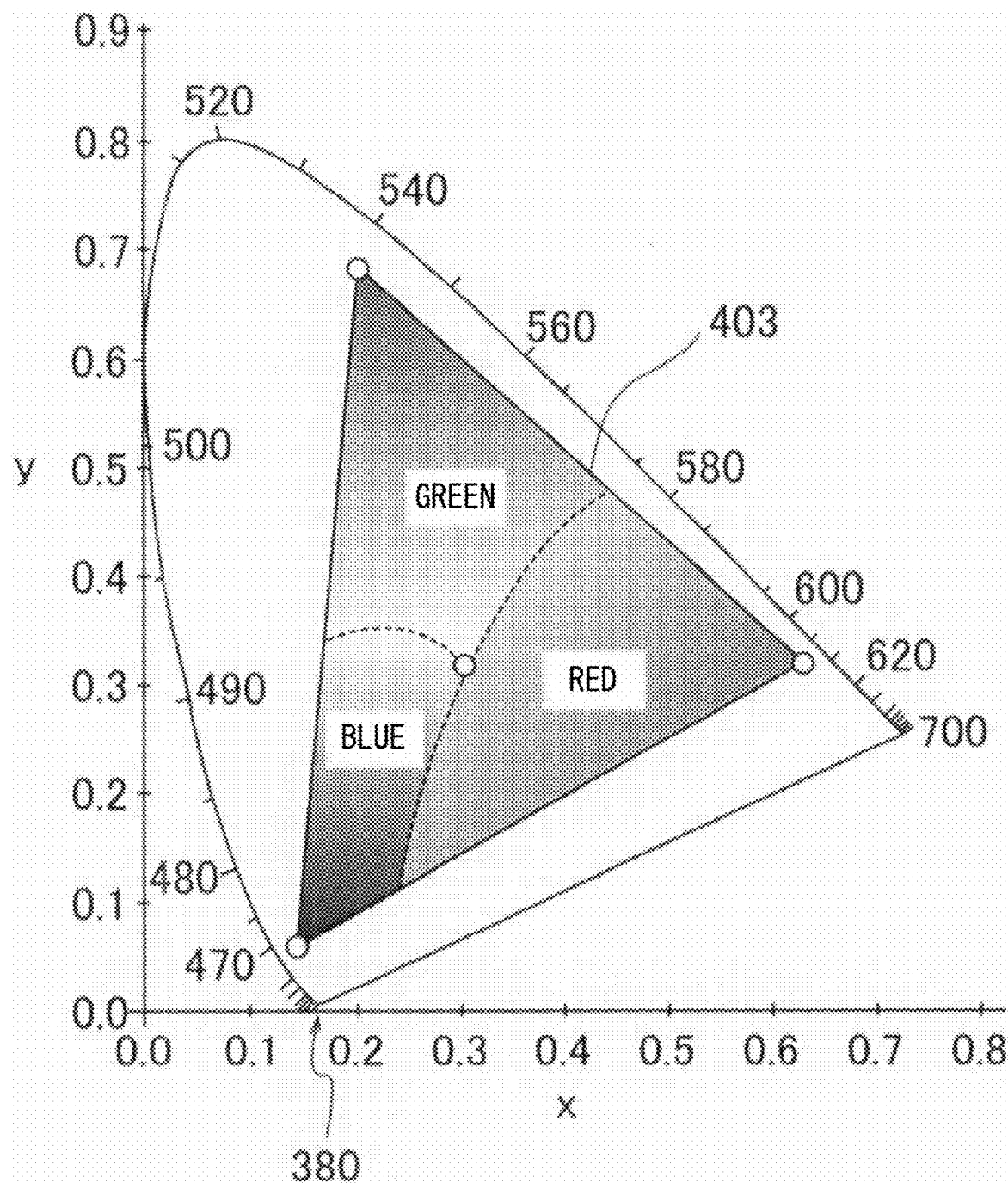
FIG. 6 is a figure for explaining a color distribution of a display system color space.

FIG. 6 is a figure for explaining a color distribution of a display system color space. Similar to (b) of FIG. 5, FIG. 6 shows a visible color coordinate system chromaticity diagram. The horizontal axis is x, and the vertical axis is y. As mentioned above, the region 403 corresponds to a visible color space. Although colors shift continuously in the visible color space, it is assumed in the explanation that the region 403 is divided into three regions of "bluish,", "greenish," and "reddish" as indicated by broken lines to simplify the explanation.

Figure 7:
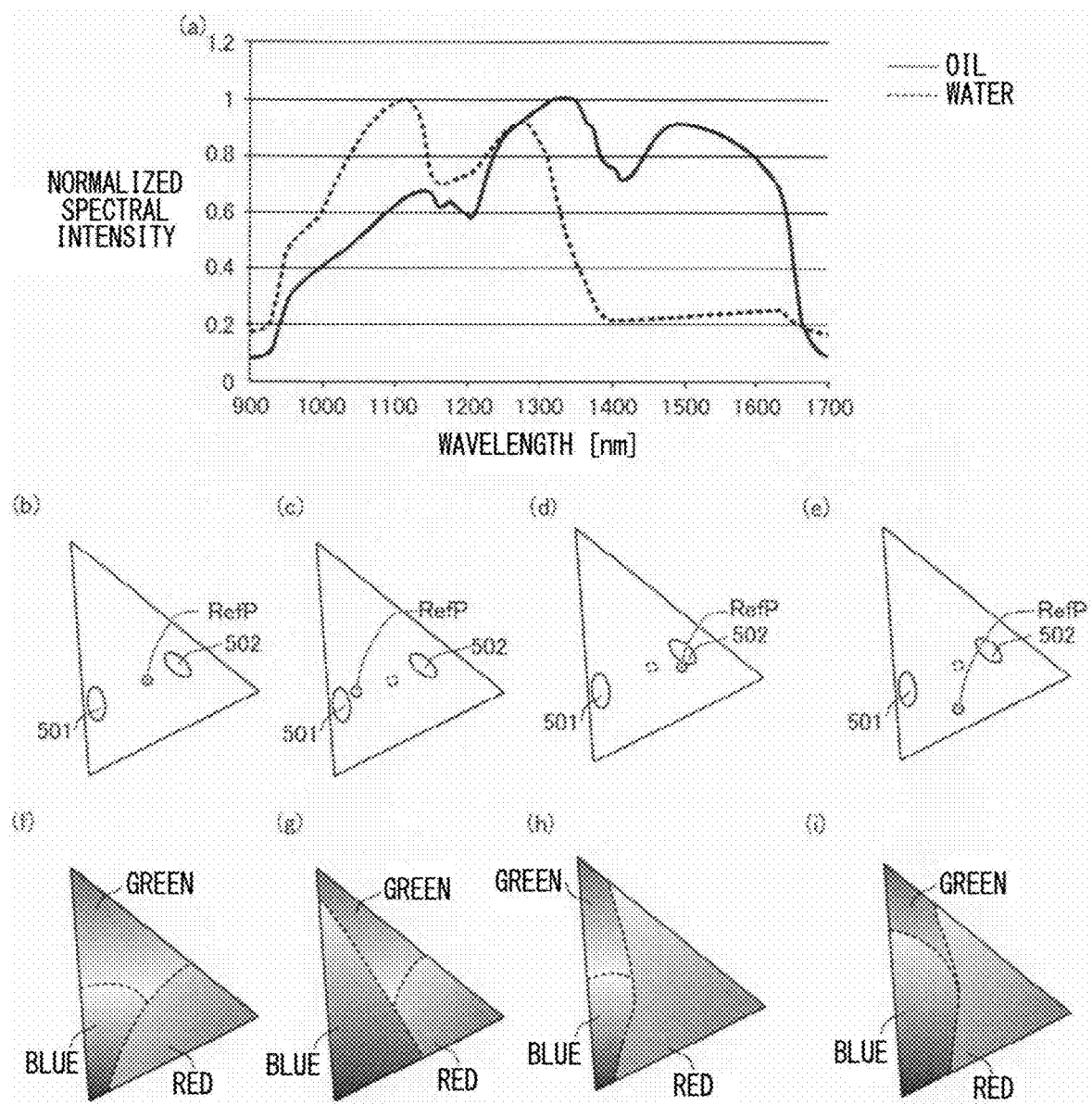
FIG. 7 is a figure for explaining a reference point.

FIG. 7 is a figure for explaining the reference point RefP. (a) of FIG. 7 is a figure for explaining object spectra. The horizontal axis indicates wavelength [nm], and the vertical axis indicates normalized spectral intensity. Objects are oil and water, as examples. The solid line indicates a spectrum of oil, and the broken line indicates a spectrum of water.

As illustrated in the figure, oil has a spectral intensity in a wide range between 900 nm and 1700 nm. In more detail, in the range of 900 nm to around 1350 nm, the spectral intensity of oil somewhat decreases in the range between around 1150 nm to around 1200 nm, but increases overall, and increases from around 0.1 to around 1. In the range of around 1350 nm to around 1700 nm, it temporarily increases in the range between around 1410 nm to around 1480 nm, but decreases overall, and decreases from around 1 to around 0.1.

The spectral intensity of water increases from a little less than 0.2 to around 1 in the range of 900 nm to around 1100 nm. In the range of around 1100 nm to around 1400 nm, it temporarily increases in the range of around 1150 nm to around 1270 nm, but decreases overall, and decreases from around 1 to around 0.2. In the range of around 1400 nm to around 1700 nm, it stays approximately flat, and somewhat decreases in the range of around 1650 nm to 1700.

Because the spectral intensity of oil ranges over a relatively wide range of the near infrared wavelength band, oil is recognized in whitish colors as compared with water in an image after conversion into the visible wavelength band. On the other hand, because the spectral intensity of water increases rapidly in the range up to around 1100 nm, and decreases rapidly in the range after around 1250 nm, it differs significantly from the spectral intensity of oil in the band up to around 1100 nm and the band after around 1200 nm. Because the spectral intensity corresponding to the wavelength bands of the NIR2 filter and the NIR3 filter is relatively low, water is recognized in bluish colors overall in an image after conversion into the visible wavelength band.

(b), (c), (d) and (e) of FIG. 7 are figures for explaining the position of the reference point RefP. Here, for simplification of the figure, only the virtual color space is extracted and illustrated. In each figure, a region 501 indicates a region in which water is mapped to the virtual color space, and a region 502 indicates a region in which oil is mapped to the virtual color space. As mentioned above, the reference point RefP is associated with the reference white RefW. The color allocated to water and the color allocated to oil are determined by a relative positional relationship between the reference point RefP, and the region 501 and the region 502.

In the example of (b) of FIG. 7, the reference point RefP is set at the same position as that of the reference point RefP shown in FIG. 4 and FIG. 5. In this case, as mentioned above, water is recognized in bluish colors, and oil is recognized in whitish colors.

In the example of (c) of FIG. 7, the reference point RefP is set closer to the region 501 than the position of the reference point RefP shown in (b) of FIG. 7 is. Because the relative distance between the reference point RefP and the region 501 becomes shorter, water is recognized not in bluish colors but in whitish colors. On the other hand, oil is recognized in dark yellow colors rather than in whitish colors. This is because the reference point RefP is set closer to the region 501, that is, closer to blue colors, thereby increasing the relative distance between the reference point RefP and the region 502.

In the example of (d) of FIG. 7, the reference point RefP is set closer to the region 502 than the position of the reference point RefP shown in (b) of FIG. 7 is. Because the relative distance between the reference point RefP and the region 501 becomes longer, water is recognized in darker blue colors. On the other hand, oil is recognized in colors close to white colors. This is because the reference point RefP is set closer to the region 502, that is, closer to red colors, thereby decreasing the relative distance between the reference point RefP and the region 502.

In the example of (e) of FIG. 7, the reference point RefP is set closer to the lower side on the paper surface than the position of the reference point RefP shown in (b) of FIG. 7 is. Because in this case, the hue changes, water is recognized in blue-greenish colors, and oil is recognized in yellow-greenish colors.

As described above, colors of objects after conversion into the visible wavelength band can be adjusted by the position of the reference point RefP. By setting the position of the reference point RefP corresponding to an object spectrum, an object can be color-discriminated easily. If color difference discrimination thresholds such as those of a McAdam ellipse are stored in the system memory 206 in advance, the position of the reference point RefP may be set by referring to the discrimination thresholds so as to make color-discrimination easy. Although in the explanation above, an example of color-discrimination of water and oil was given, the reference point RefP may be set in the region 501 if foreign substances mixed into water are to be discriminated.

(f), (g), (h) and (i) of FIG. 7 show virtual color distributions allocated to the virtual color space. The visible color space color distributions are determined according to the human visual characteristics. Accordingly, the visible color space color distributions are fixed regardless of changes in the position of the reference value RefP. If the position of the reference value RefP changes, a correspondence between virtual color space wavelengths and visible color space wavelengths changes. For example, although if the reference value RefP is set at the position shown in (b) of FIG. 7, 1150 nm and 470 nm correspond to each other, if the reference value RefP is set at the position shown in (c) of FIG. 7, 1300 nm and 470 nm correspond to each other. That is, a wider band range in the infrared wavelength band is associated with bluish colors. In other words, this means that if a color distribution is tentatively allocated to the virtual color space, the region of bluish colors becomes larger. In view of this, here, a correspondence between virtual color space wavelengths and visible color space wavelengths is explained by tentatively allocating a color distribution to the virtual color space.

(f) of FIG. 7 shows a color distribution in the case of the reference value RefP in (b) of FIG. 7. In this case, because the position of the reference value RefP and the position of the reference white RefW correspond to each other, the color distribution becomes the same as the color distribution in the visible space shown in FIG. 6.

(g) of FIG. 7 shows a color distribution in the case of the reference value RefP in (c) of FIG. 7. In this case, because the reference point RefP is set closer to the region 501, in the virtual color space, the region positioned on the left side of the paper surface from the reference point RefP becomes smaller, and conversely the region positioned on the right side on the paper surface becomes larger. Because the position of the reference white RefW corresponding to the reference point RefP is fixed, in the visible color space, the small region positioned on the left side in the virtual color space is allocated to a relatively large region. Conversely, the large region positioned on the right side in the virtual color space is allocated to a relatively small region. This means that in a color distribution for the virtual color space, the region of bluish colors becomes larger, and conversely the regions of reddish colors and greenish colors become smaller. That is, by the reference point RefP being set closer to the region 501, variations in bluish color-expression can be increased.

(h) of FIG. 7 shows a color distribution in the case of the reference value RefP in (d) of FIG. 7. In this case, because the reference point RefP is set closer to the region 502, in the virtual color space, the region positioned on the left side of the paper surface from the reference point RefP becomes larger, and conversely the region positioned on the right side on the paper surface becomes smaller. Accordingly, in the visible color space, a large region positioned on the left side in the virtual color space is allocated to a relatively small region. Conversely, the small region positioned on the right side in the virtual color space is allocated to a relatively large region. This means that in a color distribution for the virtual color space, the regions of bluish colors and greenish colors become smaller, and conversely the region of reddish colors becomes larger. That is, by the reference point RefP being set closer to the region 502, variations in reddish color-expression can be increased.

(i) of FIG. 7 shows a color distribution in the case of the reference value RefP in (e) of FIG. 7. In this case, because the reference point RefP is set closer to the lower side on the paper surface, in the virtual color space, the region positioned on the upper side of the paper surface from the reference point RefP becomes larger, and conversely the region positioned on the lower side on the paper surface becomes smaller. Accordingly, in the visible color space, the large region positioned on the upper side in the virtual color space is allocated to a relatively small region. Conversely, the small region positioned on the lower side in the virtual color space is allocated to a relatively large region. This means that in a color distribution for the virtual color space, the region of greenish colors becomes smaller, and conversely the regions of bluish colors and reddish colors become larger. That is, by the reference point RefP being set closer to the lower side on the paper surface, variations in bluish color- and reddish color-expression can be increased.

Figure 8:
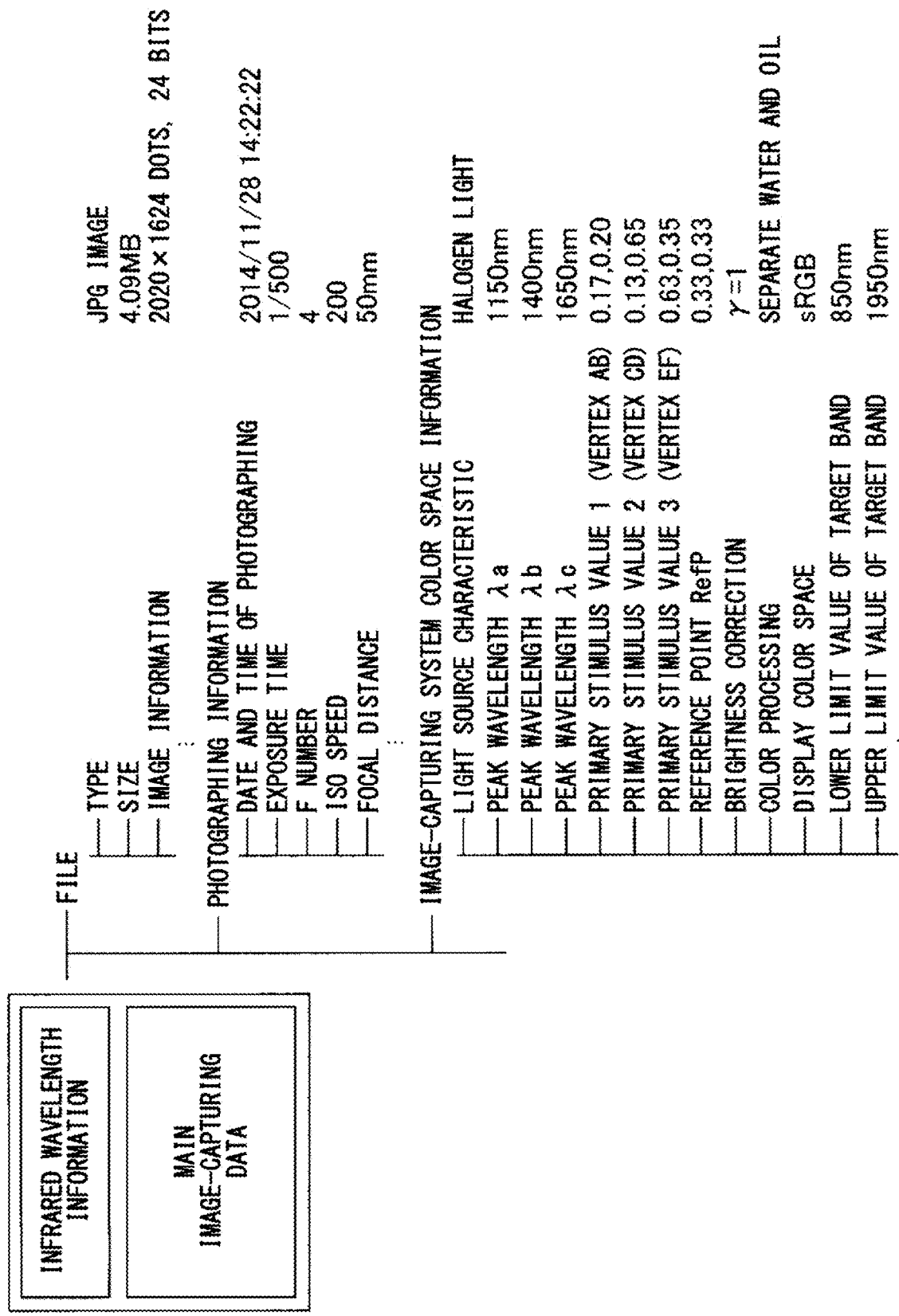
FIG. 8 is a figure showing a file structure of an image-capturing file.

FIG. 8 is a figure showing a file structure of an image-capturing file. As mentioned above, an image-capturing file has a file structure consisting, as its main elements, of main image-capturing data which is image-capturing data itself, and infrared wavelength information which is tag information of the image-capturing data.

As illustrated, in the infrared wavelength information, various types of information are written while being classified into respective categories. In the following, main types of information are explained.

In the category of file information, a type, size, image information and the like are written. Specifically, "JPG image" is written as the type, and "4.09 MB" is written as the size. As the image information, the numbers of dots in the x direction and the y direction of the present image data, and the number of bits which is the number of colors that each dot has are written. Specifically, "2020×1624 dots" is written as the number of dots, and "24 bits" is written as the number of bits.

In the category of photographing information, a date and time of photographing, exposure time, F number, ISO speed, focal distance and the like are written. Here, "2014/11/28 14:22:22" is written as the date and time of photographing, "1/500" is written as the exposure time, "4" is written as the F number, "200" is written as the ISO speed, and "50 mm" is written as the focal distance.

In the category of image-capturing system color space information, a light source characteristic, peak wavelength $\lambda a$, peak wavelength $\lambda b$, peak wavelength $\lambda c$, primary stimulus value 1 (vertex AB), primary stimulus value 2 (vertex CD), primary stimulus value 3 (vertex EF), reference point, brightness correction, color processing, display color space, lower limit value and upper limit value of a target band, and the like are written.

The light source characteristic indicates the type of light source in a photographing condition. Here, "halogen light" is written. The peak wavelength $\lambda a$ is the peak wavelength of the NIR1 filter. Here, "1150 nm" is written. The peak wavelength $\lambda b$ is the peak wavelength of the NIR2 filter. Here, "1400 nm" is written. The peak wavelength $\lambda c$ is the peak wavelength of the NIR3 filter. Here, "1650 nm" is written. The region 302 explained with reference to FIG. 4 can be defined by these peak wavelengths.

The primary stimulus value 1 is determined by the peak wavelength $\lambda a$ and the half width of the NIR1 filter, and the photosensitivity of the image sensor 100. Likewise, the primary stimulus value 2 is determined by the peak wavelength $\lambda b$ and the half width of the NIR2 filter, and the photosensitivity of the image sensor 100. The primary stimulus value 3 is determined by the peak wavelength $\lambda c$ and the half width of the NIR3 filter, and the photosensitivity of the image sensor 100. Although as explained already with reference to FIG. 4, the primary stimulus value 1 (vertex AB) is positioned on a straight line linking the peak wavelength $\lambda a$ and the reference point RefP, it does not have to be at a position on a straight line linking the peak wavelength $\lambda a$ and the reference point RefP. The same applies to the primary stimulus value 2 (vertex CD) and the primary stimulus value 3 (vertex EF). For example, it is also possible to set any of or all the primary stimulus values 1 to 3 to any values according to an object, an illumination environment or the like. Because as explained with reference to FIG. 4 and the like already, a virtual color coordinate system is defined along the coordinate axes of x', y', the primary stimulus value 1, the primary stimulus value 2 and the primary stimulus value 3 can be represented by coordinates. In more detail, the primary stimulus value 1 (vertex AB), the primary stimulus value 2 (vertex CD) and the primary stimulus value 3 (vertex EF) correspond to the respective coordinates of the vertexes of the region 303, explained with reference to FIG. 4. Here, (0.17, 0.20) is written as the primary stimulus value 1 (vertex AB), (0.13, 0.65) is written as the primary stimulus value 2 (vertex CD), and (0.63, 0.35) is written as the primary stimulus value 3 (vertex EF). By associating the primary stimulus value 1 (vertex AB), the primary stimulus value 2 (vertex CD) and the primary stimulus value 3 (vertex EF) with the corresponding vertexes among the vertex GH, the vertex IJ and the vertex KL, respectively, in the visible color space explained with reference to FIG. 5, for example, the virtual color space and the visible color space can be associated with each other.

In the reference point, "(0.33, 0.33)" is written as the coordinate of the reference point. This coordinate is a coordinate in the case where the reference point is set to the default, and is a coordinate corresponding to the reference white. If the reference point is set by a user, the coordinate of the set reference point is written. "$\gamma=1$" is written in the brightness correction.

The color processing indicates the resolution of display. In the color processing, "separate water and oil" is written. From this information, the gain corresponding to objects to be targets of color-discrimination can be determined, and the resolution of display can be determined.

The display color space indicates the color gamut that is to be set in a display system. Here, "sRGB" is written in the display color space. This information include the coordinate of the reference white RefW, and the coordinates of the three primary stimulus values in sRGB. In the example of the visible color space explained with reference to FIG. 5, (0.33, 0.33) is written as the coordinate (o, p) of the reference white RefW. Also, here, (0.14, 0.06) is written as the coordinate (g, h) of the vertex GH, (0.20, 0.68) is written as the coordinate (i, j) of the vertex IJ and (0.63, 0.32) is written as the coordinate (k, l) of the vertex KL. If information indicative of another color gamut such as Adobe RGB is written in the display color space, different values from those mentioned above are written as the three primary stimulus values. As described in detail below, based on the information in the display color space, the virtual color space three primary stimulus values and the visible color space three primary stimulus values can be associated with each other, and the reference point and the reference white can be associated with each other.

The lower limit value and upper limit value of the target band indicate the range of the output characteristic of the image sensor 100. Here, "850 nm" is written as the lower limit value, and "1950 nm" is written as the upper limit value. As mentioned above, the region 301 explained with reference to FIG. 4 is defined by this information.

If the infrared wavelength information like the one described above is generated, the infrared wavelength information can be converted into a generally used image format according to a rule of conversion into the generally used image format as long as such a conversion rule is determined. That is, as explained already, if the virtual color space is associated with the visible color space, the same conversion can be performed for the infrared wavelength information related to a particular object. Thereby, a particular visible color is associated with a particular object. Because the same object is to be displayed in the same color, the reproducibility of reproduction can be ensured. For example, water as an object is displayed in bluish colors, and oil can be displayed in whitish colors. Also, regardless of the type of display device, the compatibility of reproduction can be ensured. From what is described above, infrared wavelength information can also be generated as information necessary for conversion into a generally used image format.

Although in the explanation above, the image sensor 100 includes three types of bandpass filter with which the lower limit value and upper limit value, as its output characteristic, become 850 nm and 1950 nm, respectively, it may include other bandpass filters. Hereinafter, the details are explained.

Figure 9:
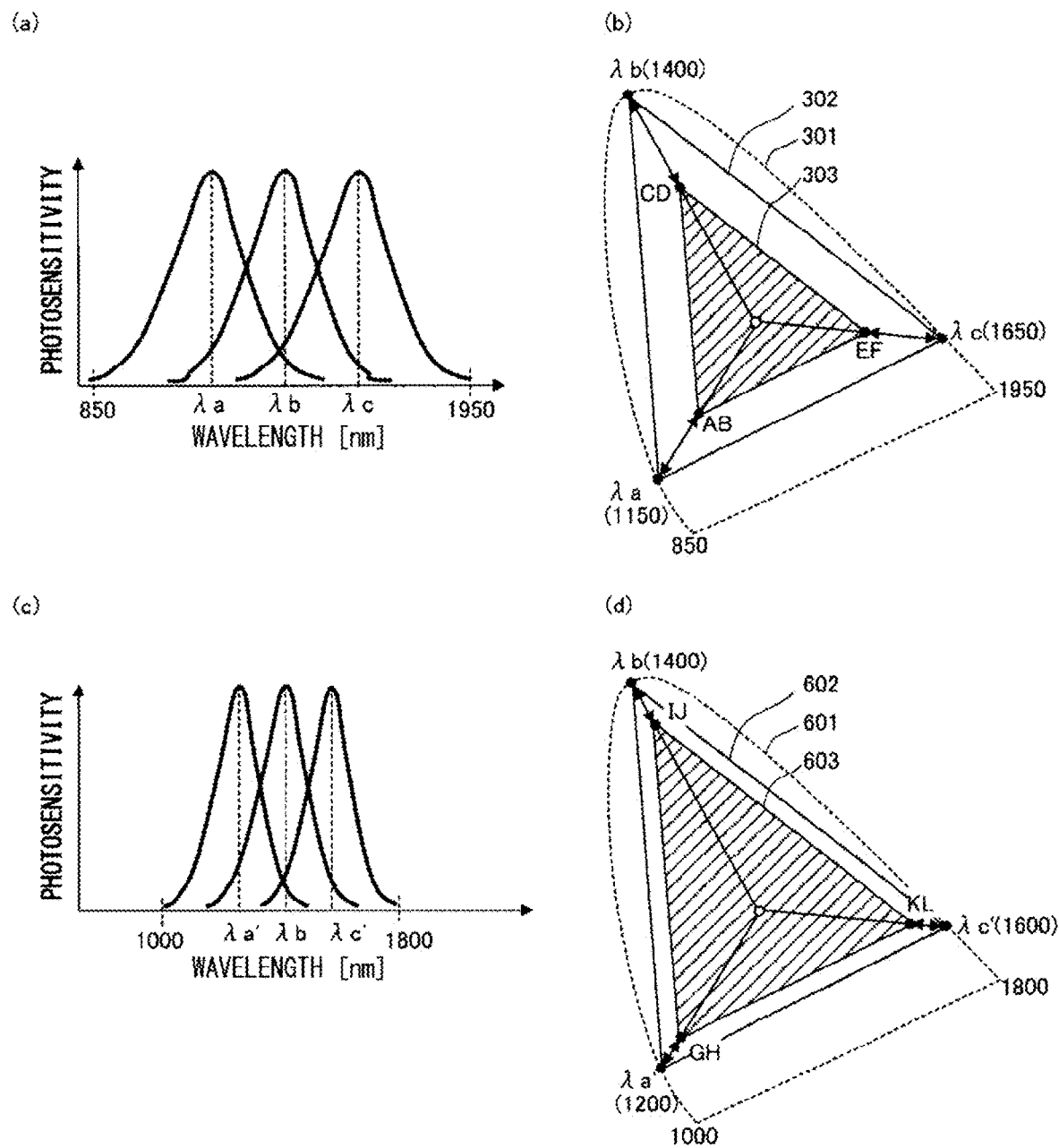
FIG. 9 is a figure for explaining a relationship between the type of bandpass filter and an image-capturing system color space.

FIG. 9 is a figure for explaining a relationship between the type of bandpass filter and an image-capturing system color space. (a) of FIG. 9 is a figure showing a sensitivity distribution of the output characteristic of the image sensor 100 already explained. The horizontal axis indicates wavelength [nm], and the vertical axis indicates photosensitivity. The lower limit value of the output characteristic is 850 nm, and its upper limit value is 1950 nm. (b) of FIG. 9 is a figure obtained by extracting the region 301, the region 302 and the region 303 in the figure shown in FIG. 4 for simplification of the figure. (c) of FIG. 9 is a figure showing a sensitivity distribution of the output characteristic of an image sensor provided with three other types of bandpass filter. The half widths of the three types of bandpass filter provided to the image sensor are narrower than the half widths of the three types of bandpass filter provided to the image sensor 100. The horizontal axis indicates wavelength [nm], and the vertical axis indicates photosensitivity. The lower limit value of the output characteristic is 1000 nm, and its upper limit value is 1800. (d) of FIG. 9 is a figure showing a region 601, a region 602 and a region 603 corresponding to the region 301, the region 302 and the region 303 according to the output characteristic shown in (c) of FIG. 9.

In the visible color space already explained, the purities of colors increase as the distance from the reference white RefW increases. In other words, a color of higher purity can be expressed as a visible color space region becomes larger. The same also applies to a case of generating an infrared wavelength band-based image. That is, a visible color space region becomes larger as a corresponding virtual color space region becomes larger; as a result, a color of higher purity can be expressed.

It can be known from comparison between the sensitivity distribution in (a) of FIG. 9 and the sensitivity distribution in (c) of FIG. 9 that the half width of each sensitivity distribution shown in the sensitivity distribution of (c) of FIG. 9 is narrower than the half width of each sensitivity distribution shown in (a) of FIG. 9. Accordingly, each pixel of an image sensor having the sensitivity distribution of (c) of FIG. 9 as its output characteristic has a pixel value based on the wavelength of a more restricted bandwidth. As a result, a color of higher purity can be expressed. Accordingly, the area of the virtual color space region 603 in (d) of FIG. 9, that is, the color-saturation becomes larger than the area of the virtual color space region 303 in (b) of FIG. 9, that is, the color-saturation.

Although in the present example, the lower limit value and upper limit value of the output characteristic shown in (a) of FIG. 9 are mutually different from the lower limit value and upper limit value of the output characteristic shown in (c) of FIG. 9, the shape of the region 301 and the shape of the region 601 are the same. That is, the lower limit value and upper limit value of the output characteristic are variable, and the region 301 and the region 601 have different pitch widths between adjacent wavelengths.

Although in the explanation above, the image sensor 100 is configured to include three types of bandpass filter, it may be configured to include further different three types of bandpass filter. That is, two types of filter set may be provided in a mixed manner. In this case, a filter set that allows easy color-discrimination may be selected according to an object. By generating a difference in hue to a certain extent at the stage of spectral diffraction, a more effective process can be expected at the stage of adjusting the position of a reference point so as to allow easy color-discrimination.

Figure 10:
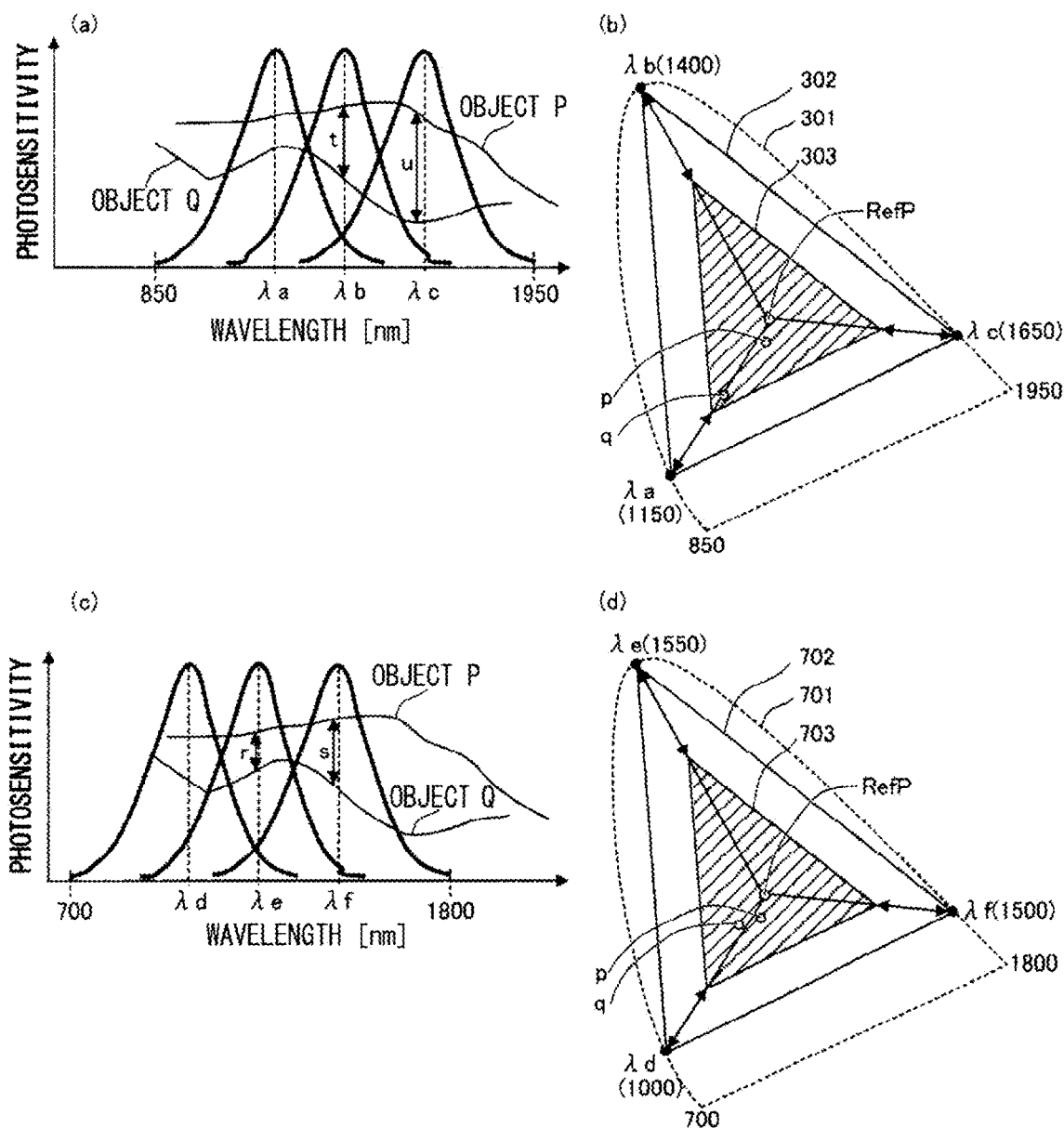
FIG. 10 is a figure for explaining a relationship between bandpass filters and object spectra.

FIG. 10 is a figure for explaining a relationship between bandpass filters and object spectra. In the present example, the image sensor 100 is photosensitive to light in the range of 700 nm to 2000 nm. (a) of FIG. 10 is a figure showing the sensitivity distribution of the output characteristic of the image sensor 100 already explained and the spectra of an object P and an object Q. The horizontal axis indicates wavelength [nm], and the vertical axis indicates photosensitivity. The lower limit value of the output characteristic is 850 nm, and its upper limit value is 1950 nm. (b) of FIG. 10 is a figure obtained by extracting the region 301, the region 302 and the region 303 in the figure shown in FIG. 4 for simplification of the figure. (c) of FIG. 10 is a figure showing the sensitivity distribution of the output characteristic in the case where different three types of bandpass filter are selected and the spectra of the object P and the object Q. The waveform of the sensitivity distribution shown in (c) of FIG. 10 and the waveform of the sensitivity distribution shown in (a) of FIG. 10 are approximately the same. However, as compared with the bandpass filters shown in FIG. 3, the different three types of bandpass filter allow passage of a wavelength band on a shorter wavelength side. The horizontal axis indicates wavelength [nm], and the vertical axis indicates photosensitivity. The lower limit value of the output characteristic is 700 nm, and its upper limit value is 1800 nm. The peak wavelength $\lambda d$ is 1000 nm, the peak wavelength is $\lambda e$ is 1250, and the peak wavelength $\lambda f$ is 1500. (d) of FIG. 10 is a figure showing a region 701, a region 702 and a region 703 corresponding to the region 301, the region 302 and the region 303 corresponding to the output characteristic shown in (c) of FIG. 10. Also, in (b) of FIG. 10 and (d) of FIG. 10, a region p indicates a region in which the object P is mapped to the virtual color space, and a region q indicates a region in which the object Q is mapped to the virtual color space.

Depending on how the filters are set in relation to the spectra of the object P and the object Q, the regions in which the object P and the object Q are mapped to the virtual color space change. Comparison between (a) of FIG. 10 and (c) of FIG. 10 shows that a gap t between the object P and the object Q is wider than a gap r between the object P and the object Q. Likewise, a gap u between the object P and the object Q is wider than a gap s between the object P and the object Q.

As shown in (c) of FIG. 10, if a filter is set to a portion where a gap between the object P and the object Q is relatively small, as shown in (d) of FIG. 10, the region p and the region q are mapped to regions close to each other. Because a large difference is not generated in hue, it may be difficult to perform color-discrimination in some cases.

On the other hand, as shown in (a) of FIG. 10, if a filter is set to a portion where a gap between the object P and the object Q is relatively large, as shown in (b) of FIG. 10, the region p and the region q are mapped to regions distant from each other. Because a large difference is generated in hue, it becomes easy to perform color-discrimination.

Figure 11:
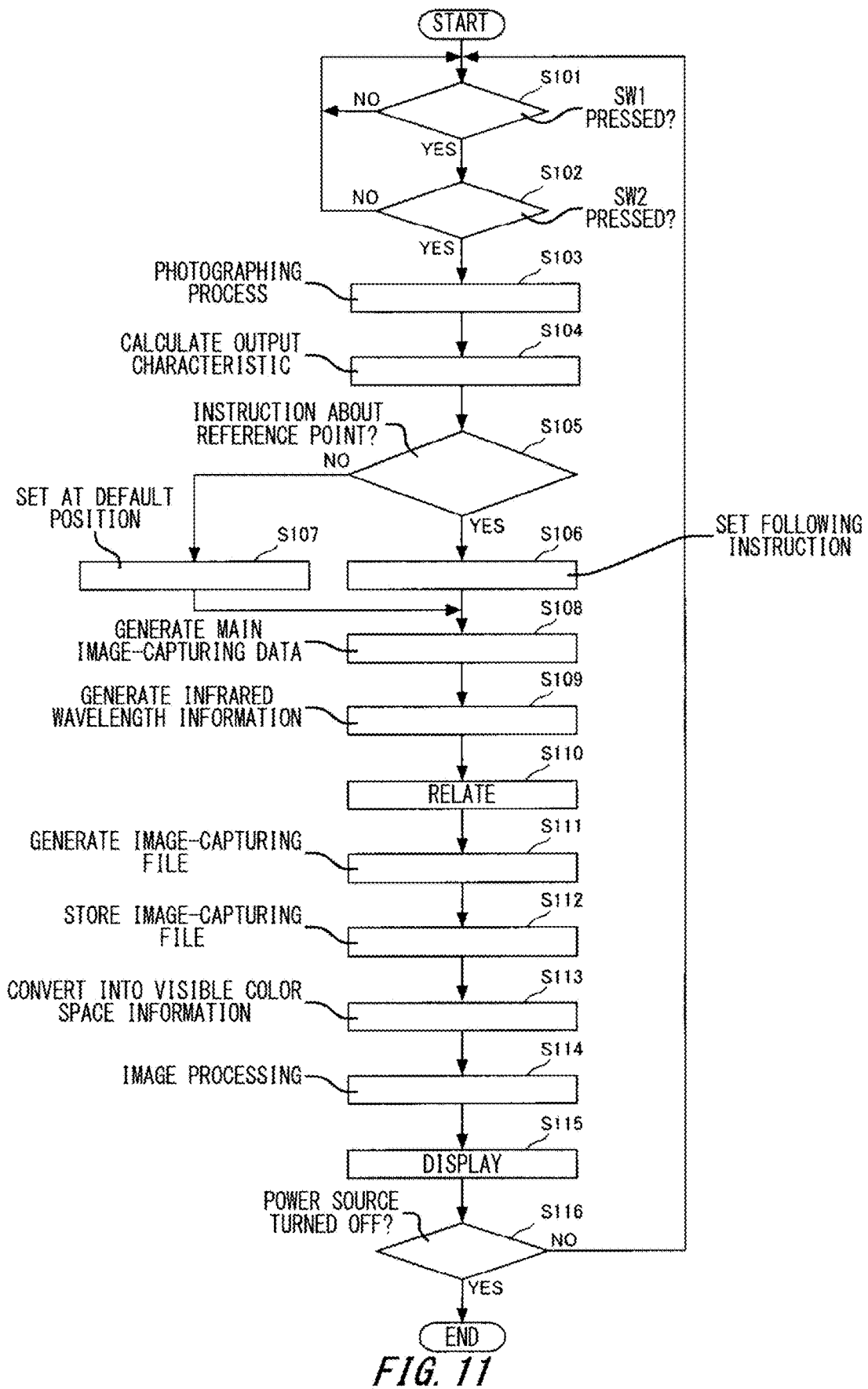
FIG. 11 is a flow diagram showing a process flow of a digital camera.

FIG. 11 is a flow diagram showing a process flow of the digital camera 10. The present flow is started when a user turns on a power source.

The control unit 201 judges whether or not the SW1 is pressed (Step S101). If it is judged that the SW1 is pressed (YES at Step S101), the control unit 201 judges whether or not the SW2 is pressed (Step S102). If it is judged that the SW2 is pressed (YES at Step S102), the control unit 201 performs a process of photographing (Step S103).

The control unit 201 reads out, as image-capturing parameters from the system memory 206, information indicative of the transmittances of three types of bandpass filter and information indicative of the photosensitivity of the image sensor 100. Then, it calculates the lower limit value and upper limit value of the output characteristic (Step S104). For example, as explained in association with FIG. 3, the output characteristic is calculated by multiplying the transmittances of the bandpass filters by the photosensitivity of the image sensor 100. Thereby, the region 301 shown in FIG. 4 is defined.

The control unit 201 judges whether there is an instruction about a reference point from a user (Step S105). If it is judged that there is an instruction about a reference point (YES at Step S105), a reference point is set following the instruction from the user (Step S106). For example, as explained in association with FIG. 7, a reference point is set within the virtual color space. If it is judged that there is not an instruction about a reference point (NO at Step S105), a reference point is set at a default position (Step S107). For example, as explained in association with FIG. 5, a reference point is set at a position corresponding to the reference white.

The image processing unit 205 generates main image-capturing data by performing various types of processing on the image-capturing data obtained by digital conversion (Step S108). On the other hand, the control unit 201 generates infrared wavelength information (Step S109). For example, it generates the infrared wavelength information following the format shown in FIG. 8.

The image processing unit 205 relates the infrared wavelength information to the main image-capturing data (Step S110) to make them into a file; thereby, it generates an image-capturing file (Step S111). The image processing unit 205 stores the image-capturing file in the memory card 220 (Step S112). The control unit 201 converts the infrared wavelength information into visible color space information (Step S113). For example, as explained with reference to FIG. 5, a virtual color space is converted into a visible color space, a reference point is converted into a reference white, and so on. The image processing unit 205 performs image processing on the main image-capturing data by referring to the visible color space information as explained already (Step S114) to convert data obtained after the image processing into display signals by the LCD drive circuit 210, and thereafter displays it on the display unit 209 (Step S115). The control unit 201 judges whether the power source is turned off (Step 116). If it is judged that the power source remains turned on (NO at Step S116), it proceeds to Step S101, and if it is judged that the power source is turned off (YES at Step S116), the series of processing ends.

Although in the explanation above, the control unit 201 relates infrared wavelength information as tag information to image-capturing data, it may relate the information as a link file to the image-capturing data. Although in the explanation above, the CIE color coordinate system was explained as an example of a visible color coordinate system, it may be another color coordinate system.

Although in the explanation above, the digital camera 10 as one example of an image-capturing device is configured to include the display unit 209, the image-capturing device may be configured not to include the display unit 209. In this case, the image-capturing device may transmit an image-capturing file to another device including a display unit. The other device can convert infrared wavelength-based image-capturing data into image data and display it by performing the processes from Step S113 to Step S115 in FIG. 11.

Although in the explanation above, bandpass filters are provided to the image sensor 100, the location at which bandpass filters are arranged is not limited to the image sensor 100. Bandpass filters may be provided as a filter unit crossing the optical axis 21 at a later stage of the taking lens 20. In this case, following user setting, the control unit 201 arranges three types of bandpass filter in order in the range of an object light flux and performs a photographing operation in synchronization with the arrangement of the respective ones. Then, the image processing unit 205 acquires sequentially three pieces of image-capturing data as image-capturing plain data configured with image-capturing data of all the pixels from the image sensor 100. Because with a configuration using a filter unit, image-capturing data corresponding to each one among the three types of bandpass filter can be obtained for all the pixels, the above-mentioned interpolation process does not have to be performed.

If the digital camera 10 is a digital camera whose lens is replaceable, and filter units are configured integral with replaceable lenses, image-capturing parameters may be stored in a lens memory in the replaceable lenses. The camera body may acquire image-capturing parameters from the lens memories.

Although in the explanation above, a reference point is associated with a reference white, because the reference point is a point just set for the purpose of separating colors, it does not necessarily have to be associated with the reference white. For example, if two objects are to be color-discriminated, it may be set right in the middle of regions of the two objects mapped to the virtual color space. Also, although the reference point is set in the region 303, it may be set outside the region 303 as long as it is set in the region 302. Although in the explanation above, the coordinate of a reference point is variable by user setting, it may be fixed. In this case, the items of reference values do not have to be present in the format explained with reference to FIG. 8. Also, from the perspective of to which visible wavelength band each pixel value of image-capturing data is to be related, the items about the vertex AB, the vertex CD and the vertex EF do not have to be present. Although in the explanation above, the positions of the peak wavelength $\lambda a$, the peak wavelength $\lambda b$ and the peak wavelength $\lambda c$ are determined uniquely by setting three points, which are the lower limit value, the upper limit value and the reference point of a target region, three points which are the lower limit value, the upper limit value and a point other than the reference point may be set. For example, by setting the coordinate of the peak wavelength $\lambda b$, the remaining peak wavelength $\lambda a$ and peak wavelength $\lambda c$ may be determined uniquely.

Although in the explanation above, the virtual color space is defined with x' as the horizontal axis and y' as the vertical axis, the virtual color space is first of all obtained by defining the infrared wavelength region space virtually as a color space, it may be defined with other axes as the horizontal axis and the vertical axis, respectively. Although in the explanation above, pitch widths of wavelengths from the lower limit value to the upper limit value of the region 301 are set in a manner similar to that for the region 401, they may be set to equal widths. Although in the explanation above, the lower limit value and upper limit value of the region 301 are variable, the lower limit value and upper limit value may be fixed. In this case, the shape of the region 301 becomes variable.

Although in the explanation above, in order to associate the virtual color space and the visible color space with each other, a reference point and a reference white are associated with each other after the lower limit values of target bands are associated with each other and upper limit values of the target bands are associated with each other, respectively, virtual color space three primary stimulus values and visible color space three primary stimulus values may be associated with each other, and additionally a reference point and a reference white may be associated with each other. In this case, the lower limit values of the target bands do not necessarily have to be associated with each other, and the upper limit values of the target bands do not necessarily have to be associated with each other. This is because the horseshoe-shape region 401 is just a range determined by monochromatic light, and the visible color space is represented by the region 403. Also, if virtual color space three primary stimulus values and visible color space three primary stimulus values are associated with each other, information indicative of the visible color space primary stimulus value to which each one among the virtual color space three primary stimulus values is associated may be written in the image-capturing system color space information.

FIG. 12 is a figure showing one example of image-capturing system color space information. In the category of image-capturing system color space information in (a) of FIG. 12, in addition to the light source characteristic, peak wavelength λa, peak wavelength λb, peak wavelength λc, primary stimulus value 1 (vertex AB), primary stimulus value 2 (vertex CD), primary stimulus value 3 (vertex EF), reference point, brightness correction, color processing, display color space, and lower limit value and upper limit value of a target band already explained with reference to FIG. 8, the corresponding primary stimulus value 1 (vertex GH), the corresponding primary stimulus value 2 (vertex IJ) and the corresponding primary stimulus value 3 (vertex KL) are written. The virtual color space vertexes (that is, the vertex AB, the vertex CD and the vertex EF), the visible color space vertexes (that is, the vertex GH, the vertex IJ and the vertex KL), the reference point RefP and the reference white RefW are the same as those explained with reference to FIG. 5.

The corresponding primary stimulus value 1 (vertex GH) indicates the visible color space primary stimulus value with which the virtual color space primary stimulus value 1 is associated. Likewise, the corresponding primary stimulus value 2 indicates the visible color space primary stimulus value with which the virtual color space primary stimulus value 2 is associated, and the corresponding primary stimulus value 3 indicates the visible color space primary stimulus value with which the virtual color space primary stimulus value 3 is associated. Here, the coordinate "(0.14, 0.06)" of the vertex GH is written as the corresponding primary stimulus value 1, the coordinate "(0.20, 0.68)" of the vertex IJ is written as the corresponding primary stimulus value 2 and the coordinate "(0.63, 0.32)" of the vertex KL is written as the corresponding primary stimulus value 3. That is, the virtual color space primary stimulus value 1 (vertex AB) is associated with the visible color space vertex GH, the virtual color space primary stimulus value 2 (vertex CD) is associated with the visible color space vertex IJ and the virtual color space primary stimulus value 3 (vertex EF) is associated with the visible color space vertex KL. Also, the coordinate of the reference point RefP is associated with (0.33, 0.33). As explained already, (0.33, 0.33) is the coordinate of the reference point RefP if it is set to a default, and a user can freely set the coordinate of the reference point. In this case also, the coordinate of the reference point RefP is associated with (0.33, 0.33) which is the coordinate of the reference white RefW.

Also, as explained with reference to FIG. 8 already, the display color space includes the coordinate of the reference white RefW. Accordingly, based on this information, it is possible to associate the coordinate of the reference point RefP with the coordinate of the reference white RefW. As described below, there are more than one combinations of virtual color space three primary stimulus values and visible color space three primary stimulus values that are related to each other. In view of this, in the example, in order to uniquely determine a correspondence, information indicative of visible color space primary stimulus values with which they are associated is written. In a similar manner to that for associating the virtual color space and the visible color space with each other, if coordinates representing an object are mapped to the region 303, the coordinates can be converted into coordinates in the region 403. That is, they can be converted into visible colors.

Although in the explanation above, the respective virtual color space three primary stimulus values are associated with the corresponding visible color space primary stimulus values with the corresponding stimulus value 1, the corresponding stimulus value 2 and the corresponding stimulus value 3, the virtual color space three primary stimulus values and the visible color space three primary stimulus values may be related to each other by another method. For example, the virtual color space three primary stimulus values and the visible color space three primary stimulus values can be associated with each other by utilizing the order in which the three primary stimulus values are written. Specifically, a primary stimulus value written first is associated with the coordinate (0.14, 0.06) of the vertex GH in the visible color space, a primary stimulus value written second is associated with the coordinate (0.20, 0.68) of the vertex IJ in the visible color space, and a primary stimulus value written third is associated with the coordinate (0.63, 0.32) of the vertex KL in the visible color space.

Here, as explained already, if "sRGB" is written as the display color space, (0.14, 0.06) is written as the coordinate (g, h) of the vertex GH, (0.20, 0.68) is written as the coordinate (i, j) of the vertex IJ, and (0.63, 0.32) is written as the coordinate (k, l) of the vertex KL; on the other hand, if information indicative of another color gamut is written, different values from those described above are written as three primary stimulus values. That is, information written as the display color space and visible color space three primary stimulus values correspond to each other in a one-to-one relationship. Accordingly, if the order in which three primary stimulus values are written is utilized, only a display color space has to be designated even if visible color space three primary stimulus values are not written for each piece of image data. The display system can associate virtual color space three primary stimulus values with visible color space three primary stimulus values according to a designated display color space following a rule related to the above-mentioned order in which three primary stimulus values are written.

Using (a) of FIG. 12 explained already as an example, the primary stimulus value 1 (vertex AB), the primary stimulus value 2 (vertex CD) and the primary stimulus value 3 (vertex EF) are written in this order. Accordingly, even if the corresponding stimulus value 1 is not written, the primary stimulus value 1 (vertex AB) written first is associated with the coordinate (0.14, 0.06) of the vertex GH in the visible color space. Likewise, even if the corresponding stimulus value 2 is not written, the primary stimulus value 2 (vertex CD) written second is associated with the coordinate (0.20, 0.68) of the vertex IJ in the visible color space, and even if the corresponding stimulus value 3 is not written, the primary stimulus value 3 (vertex EF) written third is associated with the coordinate (0.63, 0.32) of the vertex KL in the visible color space. As described above, if virtual color space three primary stimulus values and the visible color space three primary stimulus values are associated with each other by utilizing the order in which the three primary stimulus values are written, the image-capturing system color space information in (a) of FIG. 12 does not have to include the corresponding stimulus value 1, the corresponding stimulus value 2 and the corresponding stimulus value 3.

In the explanation above, the virtual color space three primary stimulus values and the visible color space three primary stimulus values are respectively associated according to wavelengths. That is, primary stimulus values that are on the short wavelength side are related to each other, primary stimulus values on the long wavelength side are related to each other, and primary stimulus values of wavelengths between the short wavelength side and the long wavelength side are related to each other, but a manner of relating them is not limited to this. Hereinafter, the details are explained. In the following example, a case where the virtual color space three primary stimulus values and the visible color space three primary stimulus values are associated with each other by utilizing the order in which the three primary stimulus values are written is explained. Accordingly, as illustrated in the figure, the image-capturing system color space information in (b) of FIG. 12 does not include the corresponding stimulus value 1, the corresponding stimulus value 2 and the corresponding stimulus value 3. The same also applies to a case where the virtual color space three primary stimulus values and the visible color space three primary stimulus values are associated with each other using the corresponding stimulus value 1, the corresponding stimulus value 2 and the corresponding stimulus value 3.

The order in which the three primary stimulus values are written in the image-capturing system color space information in (b) of FIG. 12 is different from the order in which the three primary stimulus values are written in the image-capturing system color space information in (a) of FIG. 12. Specifically, they are written in the order of the primary stimulus value 2 (vertex CD), the primary stimulus value 1 (vertex AB) and the primary stimulus value 3 (vertex EF). Accordingly, the primary stimulus value 2 (vertex CD) written first is associated with the coordinate (0.14, 0.06) of the vertex GH in the visible color space. Likewise, the primary stimulus value 1 (vertex AB) written second is associated with the coordinate (0.20, 0.68) of the vertex IJ in the visible color space, and the primary stimulus value 3 (vertex EF) written third is associated with the coordinate (0.63, 0.32) of the vertex KL in the visible color space. By relating them in the manner described above, colors allocated to the virtual color space three primary stimulus values can be changed. Specifically, because the coordinate (0.13, 0.65) of the primary stimulus value 2 (vertex CD) is associated with the coordinate (0.14, 0.06) of the vertex GH, it is associated with a bluish color. Because the coordinate (0.17, 0.20) of the primary stimulus value 1 (vertex AB) is associated with the coordinate (0.20, 0.68) of the vertex IJ, it is associated with a greenish color. Because the coordinate (0.63, 0.35) of the primary stimulus value 3 (vertex EF) is associated with the coordinate (0.63, 0.32) of the vertex KL, it is associated with a reddish color.

Although in the explanation above, the near infrared band is mentioned as an example of the invisible band, it may be another band as along as it is a band outside the visible band. For example, if the image sensor 100 is photosensitive to light in the ultraviolet band, the control unit 201 can generate ultraviolet wavelength information for converting ultraviolet band-based image-capturing data into visible color space image data.

Figure 13:
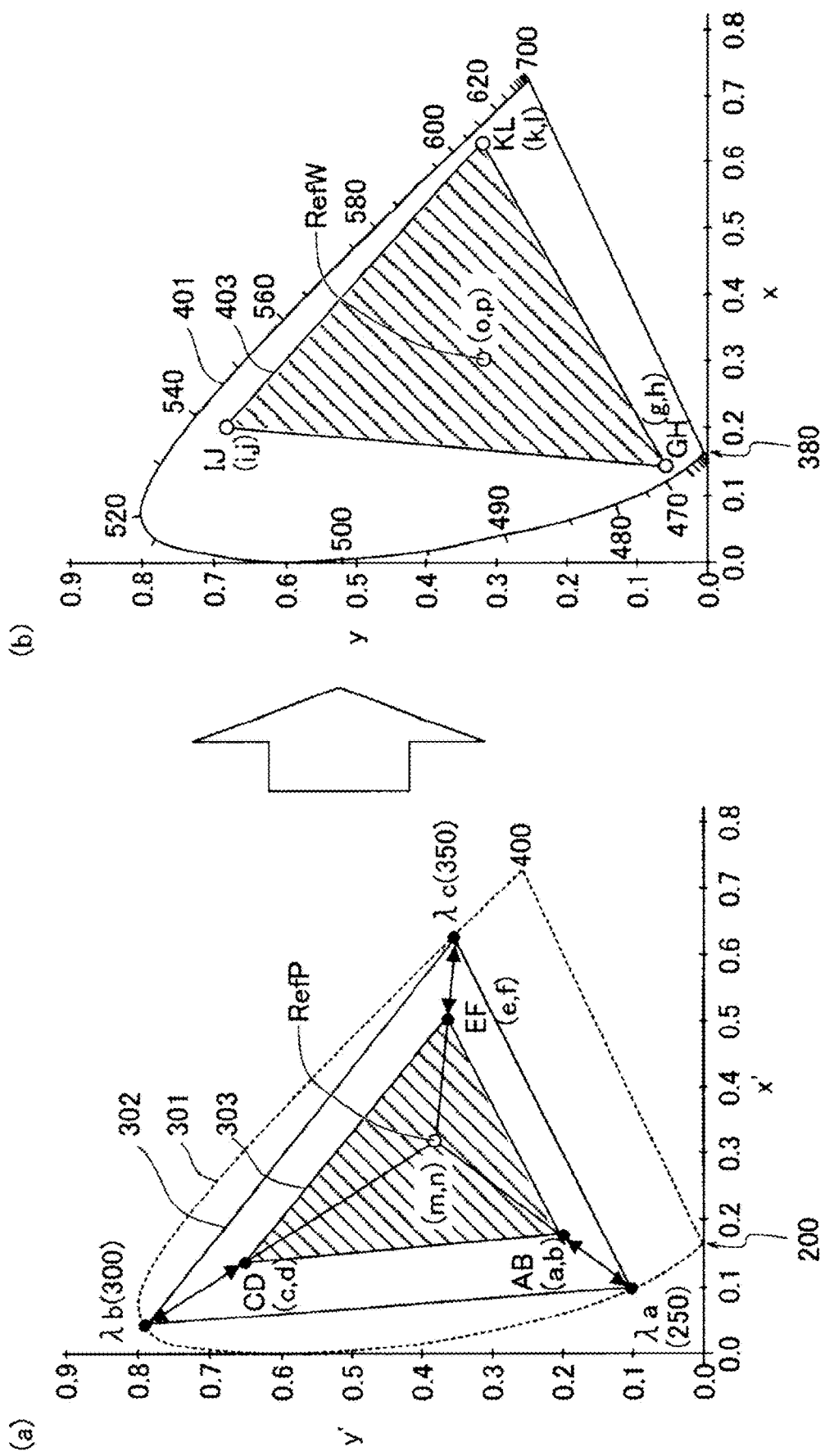
FIG. 13 is a figure for explaining a correspondence between an image-capturing system color space and a display system color space.

FIG. 13 is a figure for explaining a correspondence between an image-capturing system color space and a display system color space.

(a) of FIG. 13 is a figure for explaining a space defined by the output characteristic of the image sensor 100. Similar to FIG. 4, it illustrates x', y' corresponding to a chromaticity coordinate, x, y as coordinate axes. The horizontal axis is x', and the vertical axis is y'. In the present example, as one example, the lower limit value of the output characteristic is 200 nm and its upper limit value is 400 nm. That is, the space defined by the output characteristic is an ultraviolet band space. (b) of FIG. 13 shows a visible color coordinate system chromaticity diagram. The horizontal axis is x, and the vertical axis is y. In the present example, a case where the virtual color space three primary stimulus values and the visible color space three primary stimulus values are associated with each other, and the reference point and the reference white are associated with each other is explained.

The vertex AB which is the virtual color space primary stimulus value 1 is associated with the visible color space vertex GH. Likewise, the vertex CD which is the virtual color space primary stimulus value 2 is associated with the visible color space vertex IJ, and the vertex EF which is the virtual color space primary stimulus value 3 is associated with the visible color space vertex KL. Also, the reference point RefP is associated with the reference white RefW. Similar to the case of the infrared wavelength band, if coordinates representing an object are mapped to the region 303, the coordinates can be converted into coordinates in the region 403. That is, they can be converted into visible colors.

Although in the explanation above, the NIR1 filter and the NIR3 filter are transmissive to the peak wavelength of the NIR2 filter, and the NIR2 filter is transmissive to the respective peak wavelengths of the NIR1 filter and the NIR3 filter, in the output characteristic of the image sensor 100 explained already with reference to (c) of FIG. 3 (for example, the range within which it has a photosensitivity equal to or higher than 1%), all of the NIR1 filter, the NIR2 filter and the NIR3 filter preferably have transmittances equal to or higher than 1%. With such a configuration, a pixel provided with the NIR1 filter has a high sensitivity around 1150 nm, and has a certain degree of sensitivity around the upper limit value. Likewise, a pixel provided with the NIR2 filter has a high sensitivity around 1400 nm, and has certain degree of sensitivity around the lower limit value and upper limit value, and a pixel provided with the NIR3 filter has a high sensitivity around 1650 nm, and has a certain degree of sensitivity around the lower limit value.

If the image processing unit 205 converts infrared wavelength band-based image-capturing data into visible wavelength band-based image-capturing data to generate the image data, not only the NIR1 filter, the NIR2 filter and the NIR3 filter are associated with mutually different visible wavelength bands, respectively, but also respective wavelength band pixel signals are used and converted into visible wavelength band pixel signals. For example, a pixel signal of the wavelength band of the NIR1 filter is converted into a pixel signal of a visible wavelength band using, in addition to the pixel signal, a pixel signal of the wavelength band of the NIR2 filter and a pixel signal of the wavelength band of the NIR3 filter. In this manner, by using pixel signals of all the wavelength bands of the NIR1 filter, the NIR2 filter and the NIR3 filter, color representation at a high resolution is made possible.

In order to enhance the resolution of color representation, all of the NIR1 filter, the NIR2 filter and the NIR3 filter preferably have transmittances equal to or higher than 1% in the output characteristic of the image sensor 100 as mentioned above. However, this is not the only configuration that enhances the resolution of color representation. At least, in one possible configuration, at the peak wavelength of the wavelength band of the NIR1 filter which is on the shortest wavelength side, the wavelength band of the NIR3 filter which is on the longest wavelength side overlaps the former wavelength band. Specifically, at 1150 nm which is the peak wavelength of the wavelength band of the NIR1 filter, the NIR3 filter may have a transmittance equal to or higher than 1%. On the other hand, in one possible configuration, at least, at the peak wavelength of the wavelength band of the NIR3 filter which is on the longest wavelength side, the wavelength band of the NIR1 filter which is on the shortest wavelength side overlaps the former wavelength band. Specifically, at 1650 nm which is the peak wavelength of the wavelength band of the NIR3 filter, the NIR1 filter may have a transmittance equal to or higher than 1%. With such a combination also, because the NIR1 filter, the NIR2 filter and the NIR3 filter overlap one another over wavelength bands at least in a range including the respective peak wavelengths, color representation in multiple colors becomes possible.

Figure 14:
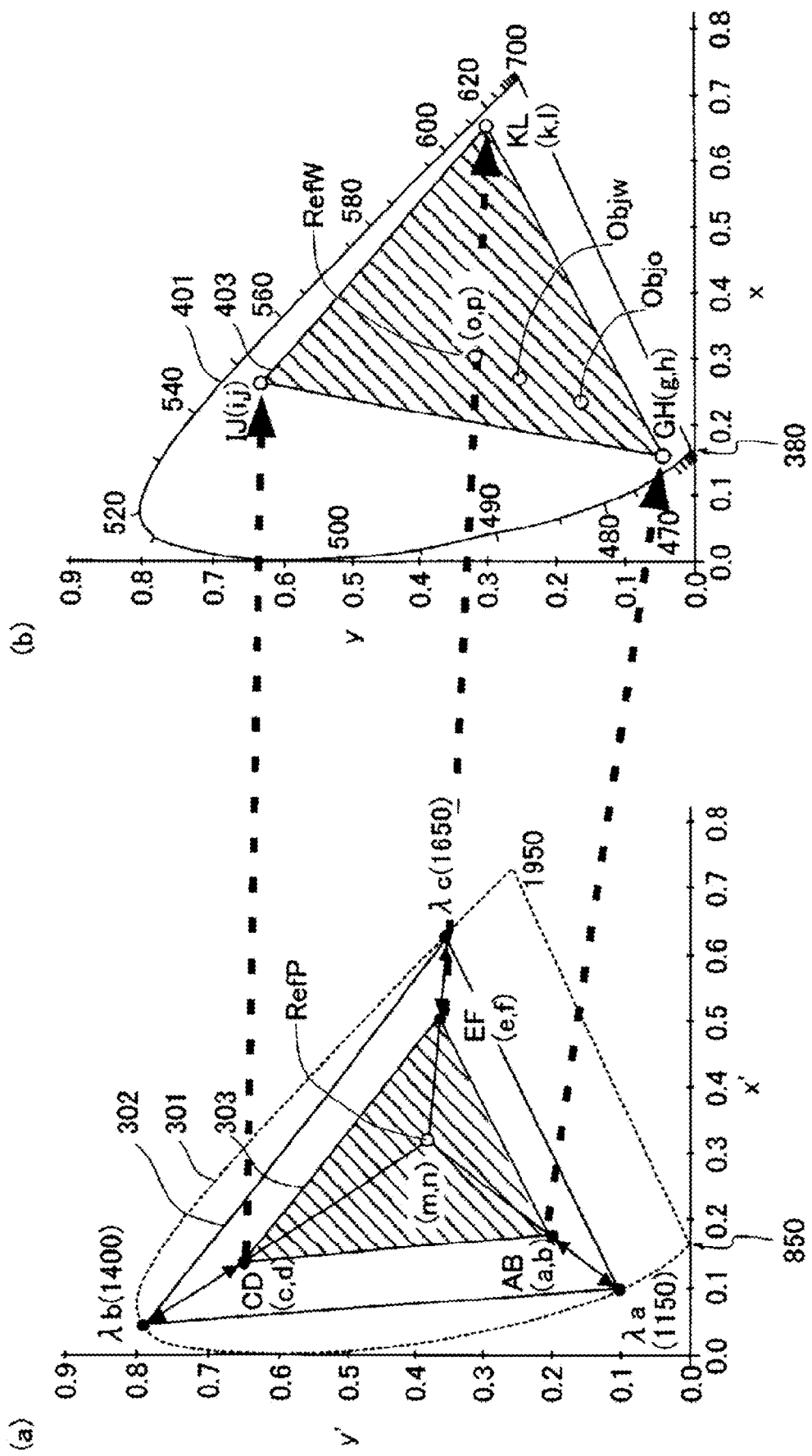
FIG. 14 is a figure for explaining one example of color allocation.

FIG. 14 is a figure for explaining one example of color allocation. (a) of FIG. 14 is the same as (a) of FIG. 5, and (b) of FIG. 14 is the same as (b) of FIG. 5.

In the example of FIG. 14, the coordinate (a, b) of the point AB is associated with the coordinate (g, h) of the point GH. That is, coordinates around the coordinate (a, b) of the point AB are associated with bluish colors. The coordinate (c, d) of the point CD is associated with the coordinate (i, j) of the point IJ. That is, coordinates around the coordinate (c, d) of the point CD are associated with greenish colors. The coordinate (e, f) of the point EF is associated with the coordinate (k, l) of the point KL. That is, coordinates around the coordinate (e, f) of the point EF are associated with reddish colors.

As explained already using (a) of FIG. 7, because the spectral intensity of water increases rapidly in the band up to around 1100 nm, and decreases rapidly in the band after around 1250 nm, it differs significantly from the spectral intensity of oil in the band up to around 1100 nm and the band after around 1200 nm. Because the spectral intensity corresponding to the wavelength bands of the NIR2 filter and the NIR3 filter is relatively low, water Objw is mapped to a position close to the point GH in the color coordinate system chromaticity diagram. Thus, it is recognized in bluish colors overall in an image after conversion into the visible wavelength band. On the other hand, because the spectral intensity of oil ranges over a relatively wide range in the near infrared wavelength band, oil Objo is mapped to a position close to the reference white RefW in the color coordinate system chromaticity diagram. Thus, it is recognized in somewhat whitish color as compared with water in an image after conversion into the visible wavelength band.

Figure 15:
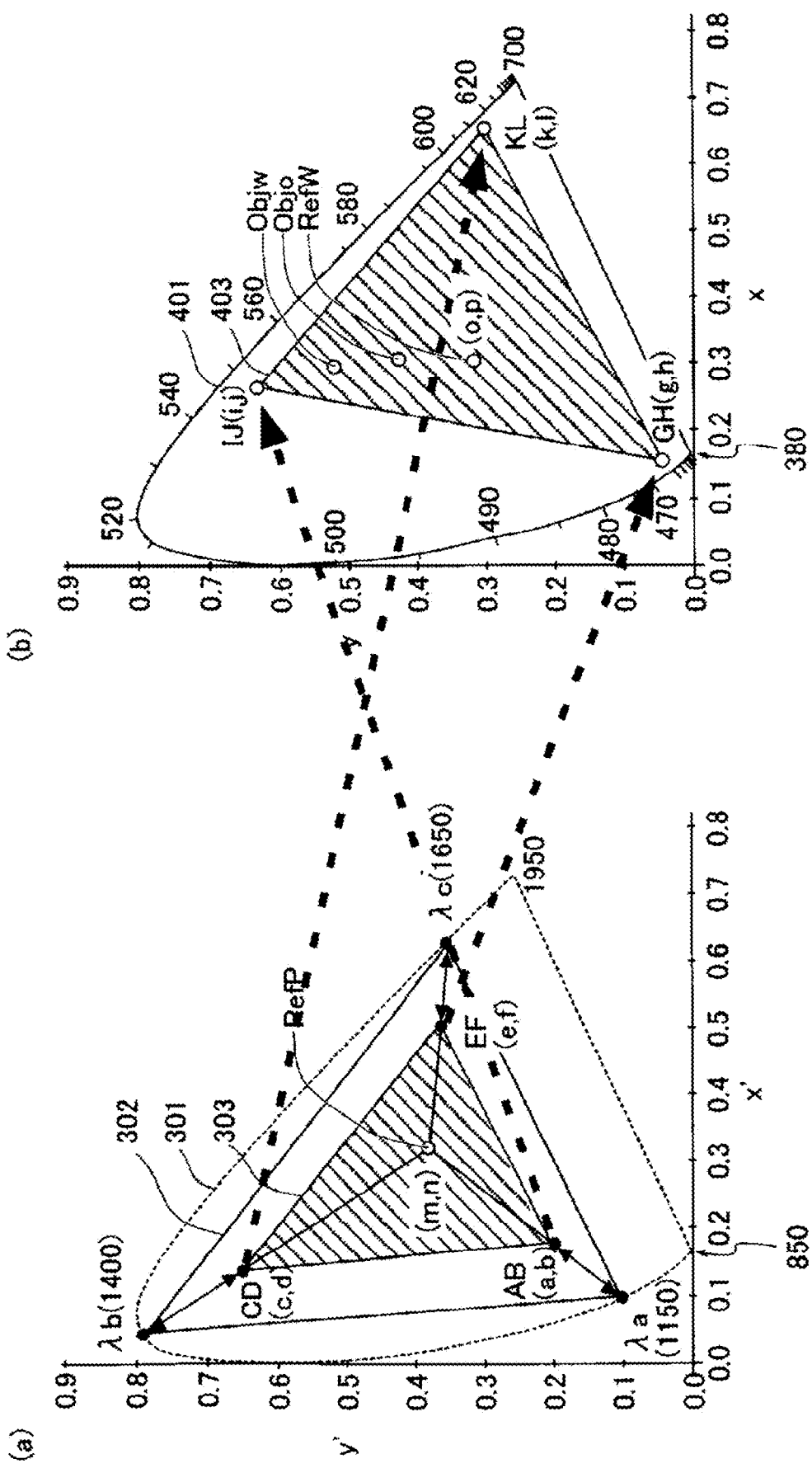
FIG. 15 is a figure for explaining another example of color allocation.

FIG. 15 is a figure for explaining another example of color allocation. (a) of FIG. 15 is the same as (a) of FIG. 5, and (b) of FIG. 15 is the same as (b) of FIG. 5.

In the example of FIG. 15, the coordinate (a, b) of the point AB is associated with the coordinate (i, j) of the point IJ. That is, coordinates around the coordinate (a, b) of the point AB are associated with greenish colors. The coordinate (c, d) of the point CD is associated with the coordinate (k, l) of the point KL. That is, coordinates around the coordinate (c, d) of the point CD are associated with reddish colors. The coordinate (e, f) of the point EF is associated with the coordinate (g, h) of the point GH. That is, coordinates around the coordinate (e, f) of the point EF are associated with bluish colors.

In this example, the water Objw is mapped to a position close to the point IJ in the color coordinate system chromaticity diagram. Thus, it is recognized in greenish colors overall in an image after conversion into the visible wavelength band. On the other hand, the oil Objo is mapped to a position close to the reference white RefW in the color coordinate system chromaticity diagram. Thus, it is recognized in somewhat whitish color as compared with water in an image after conversion into the visible wavelength band.

Figure 16:
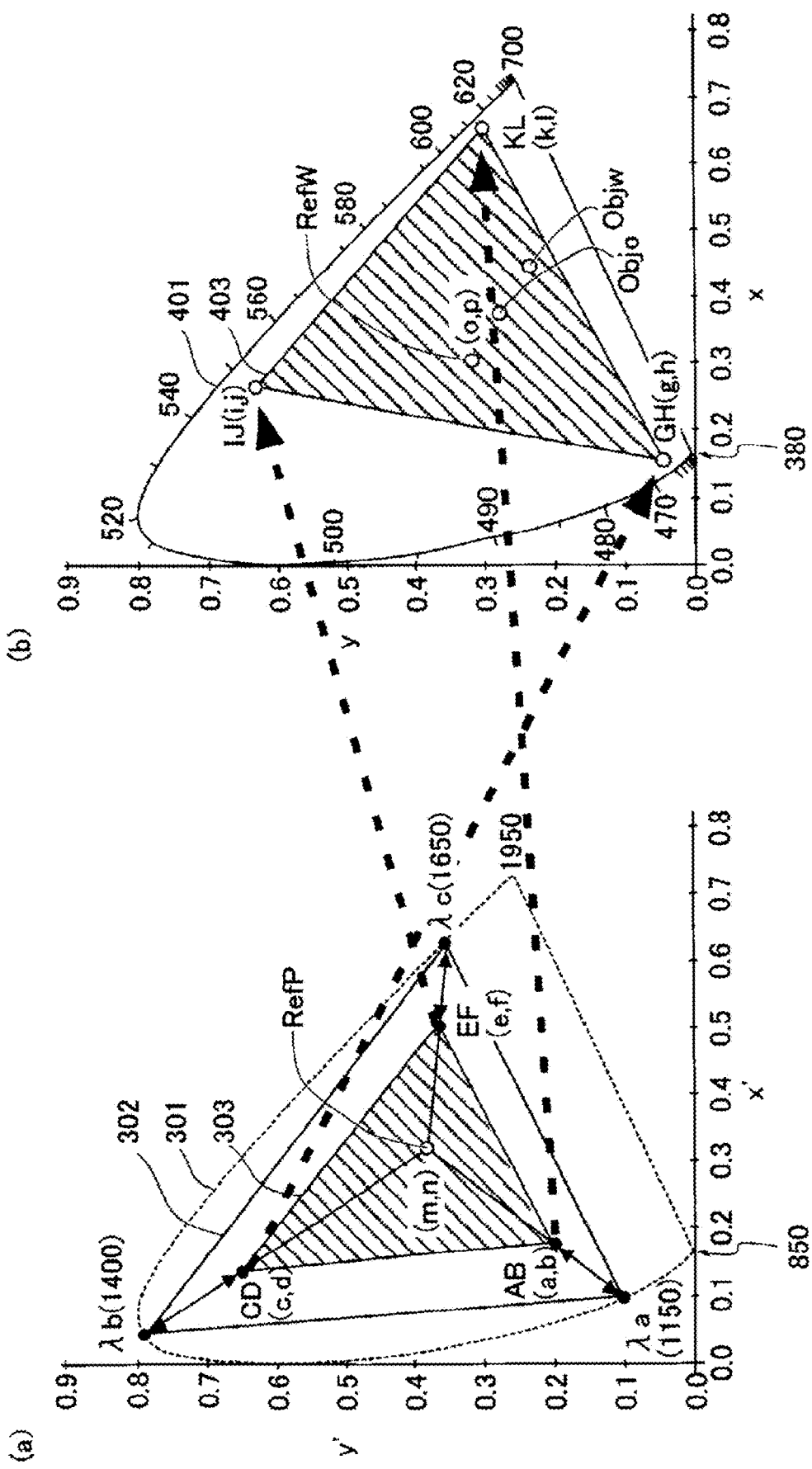
FIG. 16 is a figure for explaining another example of color allocation.

FIG. 16 is a figure for explaining another example of color allocation. (a) of FIG. 16 is the same as (a) of FIG. 5, and (b) of FIG. 16 is the same as (b) of FIG. 5.

In the example of FIG. 16, the coordinate (a, b) of the point AB is associated with the coordinate (k, l) of the point KL. That is, coordinates around the coordinate (a, b) of the point AB are associated with reddish colors. The coordinate (c, d) of the point CD is associated with the coordinate (g, h) of the point GH. That is, coordinates around the coordinate (c, d) of the point CD are associated with bluish colors. The coordinate (e, f) of the point EF is associated with the coordinate (i, j) of the point IJ. That is, coordinates around the coordinate (e, f) of the point EF are associated with greenish colors.

In this example, the water Objw is mapped to a position close to the point KL in the color coordinate system chromaticity diagram. Thus, it is recognized in reddish colors overall in an image after conversion into the visible wavelength band. On the other hand, the oil Objo is mapped to a position close to the reference white RefW in the color coordinate system chromaticity diagram. Thus, it is recognized in somewhat whitish color as compared with water in an image after conversion into the visible wavelength band.

As explained above, depending on how the virtual color space three primary stimulus values and the visible color space three primary stimulus values are related to each other, an observation target can be represented in different colors. Humans are known to be generally more sensitive to differences in bluish colors and reddish colors than to greenish colors. In view of this, in the present embodiment, the observation information for color-discriminating water and oil indicates that the coordinate (a, b) of the point AB is associated with the coordinate (k, l) of the point KL, the coordinate (c, d) of the point CD is associated with the coordinate (g, h) of the point GH and the coordinate (e, f) of the point EF is associated with the coordinate (i, j) of the point IJ. By performing color allocation according to this observation information, the image processing unit 205 can allocate a primary stimulus value corresponding to the highest spectral intensity among spectral intensities corresponding to the respective wavelength bands of the NIR1 filter, the NIR2 filter and the NIR3 filter to the point KL, that is, a reddish color. The observation information may be generated to indicate that the coordinate (a, b) of the point AB is associated with the coordinate (g, h) of the point GH, that is, a bluish color, the coordinate (c, d) of the point CD is associated with the coordinate (i, j) of the point IJ, and the coordinate (e, f) of the point EF is associated with the coordinate (k, l) of the point KL. As described above, by switching over manners of relating colors in accordance with the human visual characteristics corresponding to an object spectrum as appropriate, it becomes possible to make color-discrimination of an object easy in a visible image.

Figure 17:
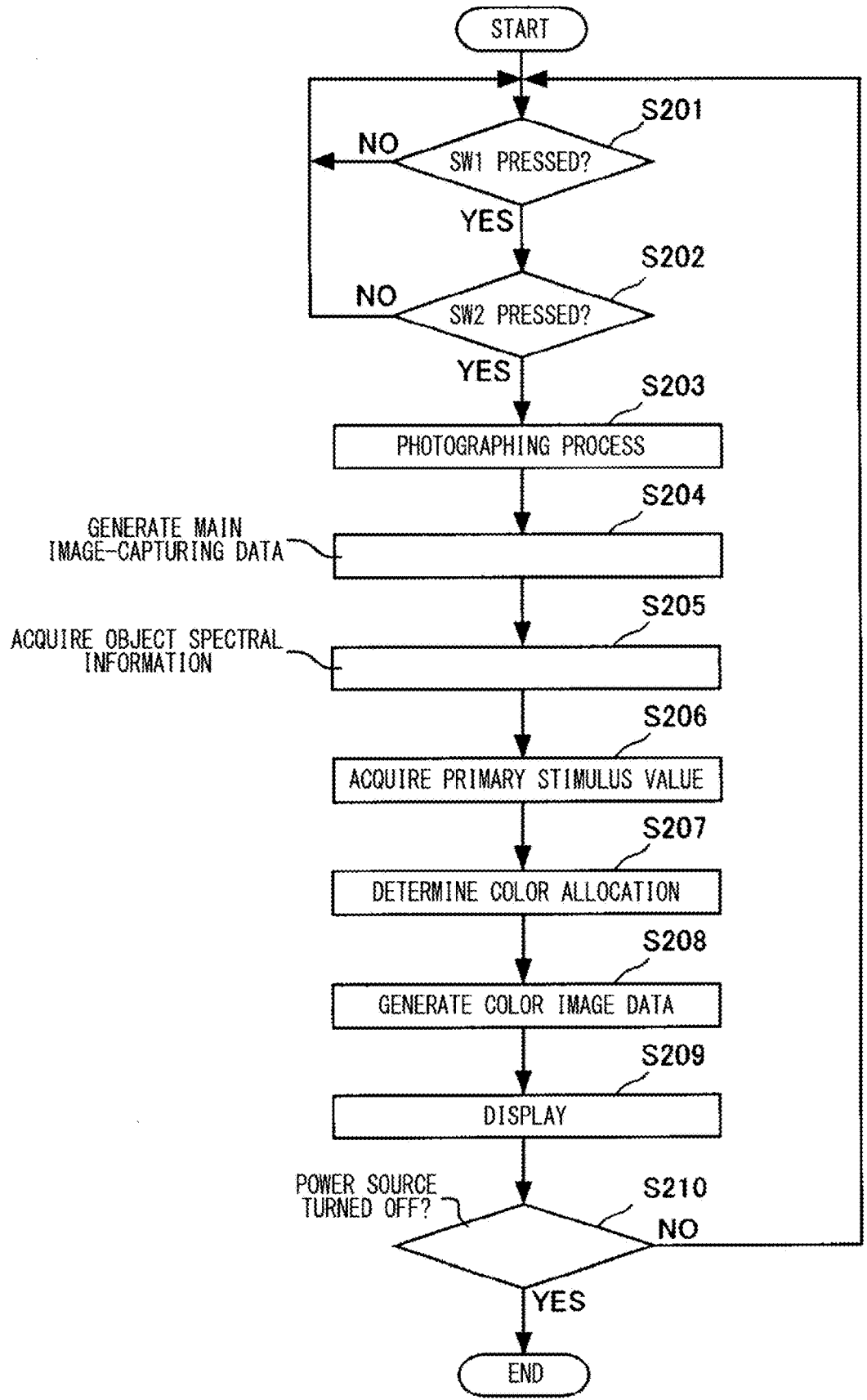
FIG. 17 is a flow diagram showing a process flow of a digital camera.

FIG. 17 is a flow diagram showing a process flow of the digital camera 10. The present flow is started when a user turns on a power source. It is assumed that water and oil are set as two observation targets to be targets of color-discrimination through a menu screen related to setting of observation targets explained already, and a user photographs water and oil.

The control unit 201 judges whether or not the SW1 is pressed (Step S201). If it is judged that the SW1 is pressed (YES at Step S201), the control unit 201 judges whether or not the SW2 is pressed (Step S202). If it is judged that the SW2 is pressed (YES at Step S202), the control unit 201 performs a process of photographing (Step S103).

The image processing unit 205 generates main image-capturing data by performing various types of processing on the image-capturing data obtained by digital conversion (Step S204). The image processing unit 205 acquires, from the system memory 206, observation information corresponding to a set observation target (Step S205). Here, observation information for color-discriminating water and oil is acquired. The image processing unit 205 acquires virtual color space three primary stimulus values and visible color space three primary stimulus values (Step S206). The image processing unit 205 uses the acquired observation information, and the virtual color space three primary stimulus values and the visible color space three primary stimulus values to determine color allocation (Step S207). As explained already with reference to FIGS. 14 to 16, for example, the coordinate (a, b) of the point AB is associated with the coordinate (k, l) of the point KL, the coordinate (c, d) of the point CD is associated with the coordinate (g, h) of the point GH and the coordinate (e, f) of the point EF is associated with the coordinate (i, j) of the point IJ. Then, image processing is performed on the main image-capturing data according to the determined color allocation to generate color image data (Step S208).

After converting the color image data into display signals by the LCD drive circuit 210, it is displayed on the display unit 209 (Step S209). The control unit 201 judges whether the power source is turned off (Step S210). If it is judged that the power source remains turned on (NO at Step S210), it proceeds to Step S201, and if it is judged that the power source is turned off (YES at Step S210), the series of processing ends.

Figure 18:
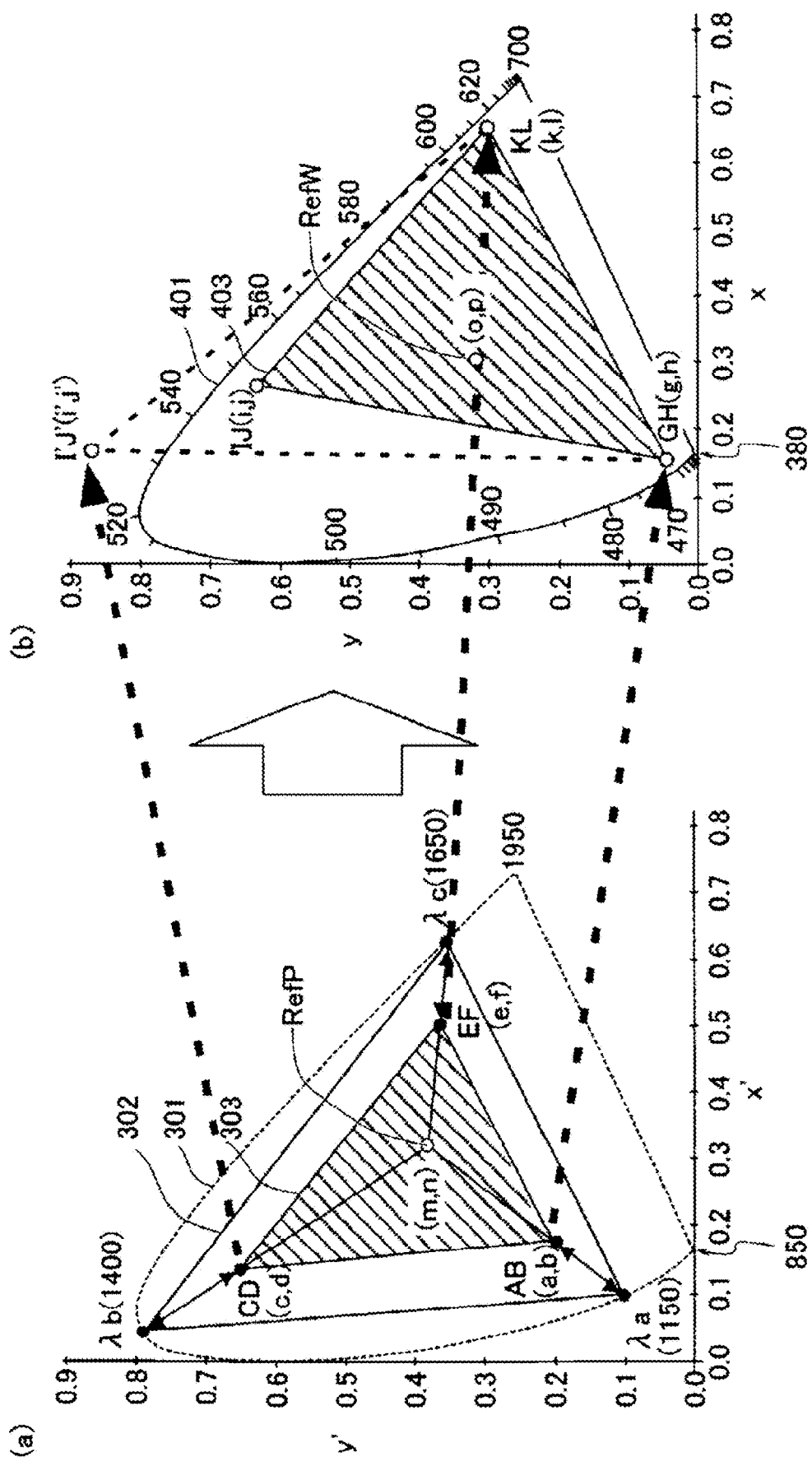
FIG. 18 is a figure for explaining another example of a correspondence between an image-capturing system color space and a display system color space.

Although in the explanation above, the image processing unit 205 associates the respective virtual color space three primary stimulus values with points in the visible color space, at least one of virtual color space three primary stimulus values may be associated with a point outside the visible color space. FIG. 18 is a figure for explaining another example of a correspondence between an image-capturing system color space and a display system color space. (a) of FIG. 18 is the same as (a) of FIG. 5. (b) of FIG. 18 shows a visible color coordinate system chromaticity diagram. The horizontal axis is x, and the vertical axis is y.

In the example of FIG. 18, the coordinate (a, b) of the point AB is associated with the coordinate (g, h) of the point GH. The coordinate (c, d) of the point CD is associated with the coordinate (i', j') of the point I'J'. The point I'J' is a point outside the region 403 indicating the visible color space. The coordinate (e, f) of the point EF is associated with the coordinate (k, l) of the point KL. In the region 401, the color-saturation becomes higher as the distance to the outside becomes shorter. Accordingly, by associating the coordinate (c, d) of the point CD with the coordinate (i', j') of the point I'J' located outward from the coordinate (i, j) of the point IJ, the greenish color-saturation can be improved. In more detail, if the coordinate (c, d) of the point CD is associated with the coordinate (i, j) of the point IJ, an observation target is expressed with whitish colors overall if the observation target is mapped to around the reference white RefW, but the position to which the observation target is mapped move outward by associating it with the coordinate (i', j') of the point I'J'. Because as a result, it is expressed in more greenish colors, coloring of the observation target can be improved.

Although in the explanation above, at least one of virtual color space three primary stimulus values is associated with a point outside the visible color space, it does not have to be outside the visible color space. For example, if by applying, to the coordinate (i, j) of the point IJ, an amplification gain in a direction toward the outside of the region 401, the color-saturation can be improved, it may be associated with a point in the visible color space. An amplification gain may be applied to another primary stimulus value other than the coordinate (i, j) of the point IJ, or an amplification gain may be applied to a plurality of primary stimulus values.

Although in the explanation above, the image processing unit 205 associates the primary stimulus value corresponding to the highest spectral intensity with the point KL or the point GH, if the system memory 206 stores a color difference discrimination threshold, it may perform association using this color difference discrimination threshold. As one example of color difference discrimination thresholds, a discrimination threshold corresponding to a McAdam ellipse can be used.

Figure 19:
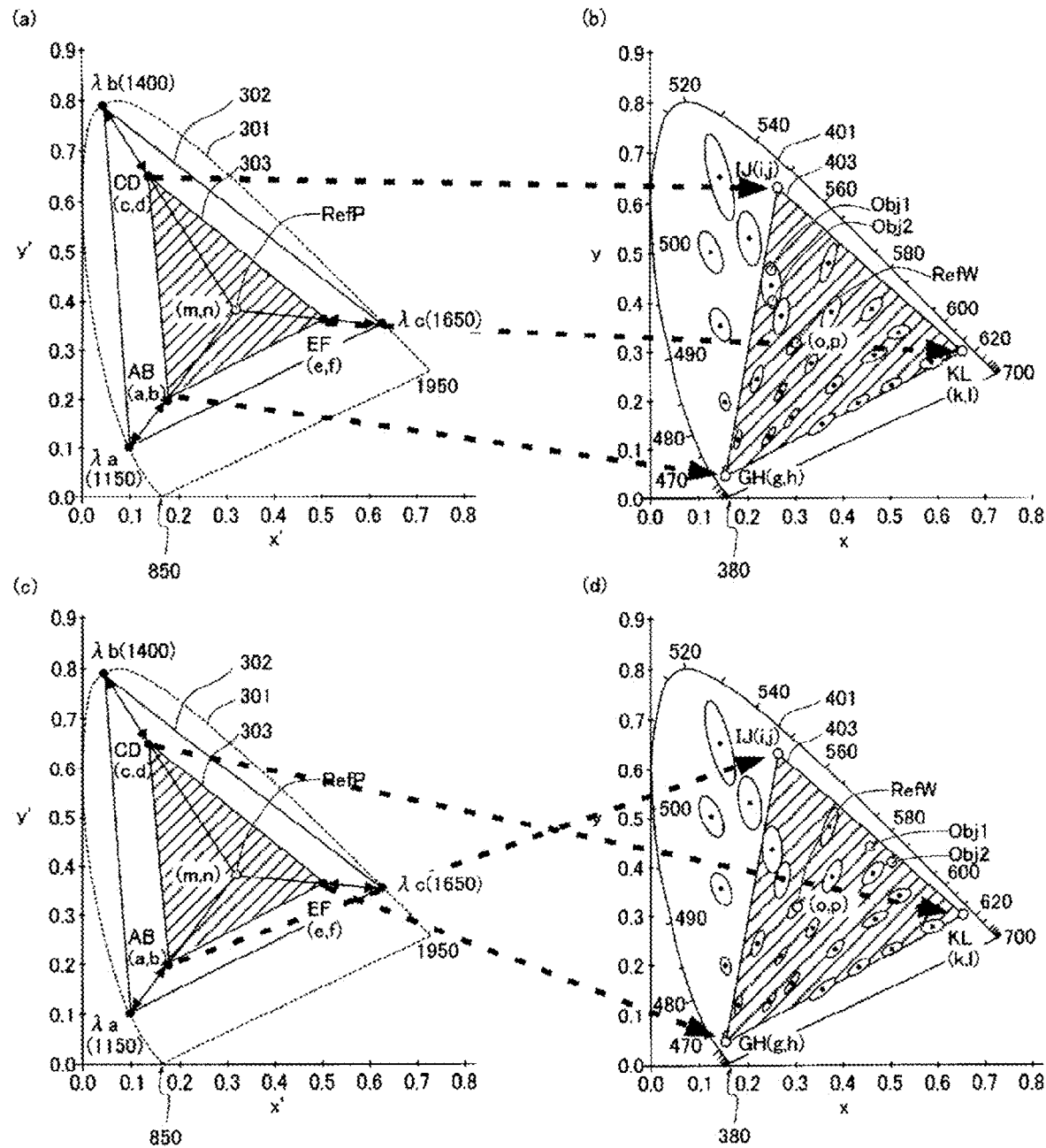
FIG. 19 is a figure for explaining another example of a correspondence between an image-capturing system color space and a display system color space.

FIG. 19 is a figure for explaining another example of a correspondence between an image-capturing system color space and a display system color space. (a) and (c) of FIG. 19 are the same as (a) of FIG. 5. (b) and (d) of FIG. 19 show visible color coordinate system chromaticity diagrams. The horizontal axis is x, and the vertical axis is y. Ellipses in the region 401 in (b) and (d) of FIG. 19 indicate McAdam ellipses.

In the example of (a) and (b) of FIG. 19, similar to the example of FIG. 14, the coordinate (a, b) of the point AB is associated with the coordinate (g, h) of the point GH. The coordinate (c, d) of the point CD is associated with the coordinate (i, j) of the point IJ. The coordinate (e, f) of the point EF is associated with the coordinate (k, l) of the point KL. An observation target Obj1 and an observation target Obj2 are mapped in the same McAdam ellipse. In this case, it is very difficult for a user to color-discriminate the observation target Obj1 and the observation target Obj2.

In the example of (c) and (d) of FIG. 19, similar to the example of FIG. 15, the coordinate (a, b) of the point AB is associated with the coordinate (i, j) of the point IJ. The coordinate (c, d) of the point CD is associated with the coordinate (k, l) of the point KL. The coordinate (e, f) of the point EF is associated with the coordinate (g, h) of the point GH. The observation target Obj1 and the observation target Obj2 are not mapped in the same McAdam ellipse. In this case, it becomes easy for a user to color-discriminate the observation target Obj1 and the observation target Obj2.

Based on what is described above, the image processing unit 205 may alter color allocation if the observation target Obj1 and the observation target Obj2 are mapped to the same McAdam ellipse. For example, it may alter color allocation into the one explained with reference to (c) and (d) of FIG. 19. Thereby, it becomes possible to convert a color with which color-discrimination is difficult into a color with which color-discrimination is easy. The color difference discrimination threshold is not limited to a discrimination threshold corresponding to a McAdam ellipse. For example, it may be a discrimination threshold corresponding to another principle such as the color universal design.

Responding to a user manipulation accepted by the manipulating unit 208, the image processing unit 205 may change any one or more of the hue, color-saturation, brightness and gradation characteristic of at least one piece of pixel data related to a region. For example, data can be converted into a color that allows easier color-discrimination by changing the hue.

Although in the explanation above, observation information indicates how virtual color space three primary stimulus values and visible color space three primary stimulus values are related to each other, it may be information indicative of the spectrum itself of an observation target. In this case, the image processing unit 205 may determine how to relate virtual color space three primary stimulus values and visible color space three primary stimulus values based on the output characteristic of the image sensor 100 and the observation information. For example, as mentioned above, a primary stimulus value corresponding to the highest spectral intensity may be associated with the point KL or the point GH.

The control unit 201 may generate infrared wavelength information as one example of invisible wavelength information for converting image-capturing data generated from the output signal of the image sensor 100 into visible color space image data. As described in detail below, the infrared wavelength information is defined based on the sensitivity characteristic which is the output characteristic of the image sensor 100 to an object light flux wavelength.

The image processing unit 205 may record, in the memory card 220, an image-capturing file in which infrared wavelength information as tag information is related to image-capturing data having undergone various types of processing. Then, using the infrared wavelength information, it may convert the infrared wavelength band-based image-capturing data into visible wavelength band-based image data to generate color image data.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an device, system, program, and method shown in the claims, embodiments, or diagrams can be performed in any order as long as the order is not indicated by "prior to," "before," or the like and as long as the output from a previous process is not used in a later process. Even if the photographing process flow is described using phrases such as "first" or "next" in the claims, embodiments, or diagrams, it does not necessarily mean that the process must be performed in this order.

Various embodiments of the present invention may be described with reference to flowcharts and block diagrams whose blocks may represent (1) steps of processes in which operations are performed or (2) units of apparatuses responsible for performing operations. Certain steps and units may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Computer-readable media may include any tangible device that can store instructions for execution by a suitable device, such that the computer-readable medium having instructions stored therein comprises an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., to execute the computer-readable instructions to create means for performing operations specified in the flowcharts or block diagrams. Examples of processors include computer processors, processing units, microprocessors, digital signal processors, controllers, microcontrollers, etc.

What is claimed is:

1. An image-capturing device comprising:
   an image sensor that is photosensitive to light in an invisible band;
   a controller configured to generate invisible wavelength information defined based on a sensitivity characteristic, which is an output characteristic of the image sensor, to an object light flux wavelength for conversion of image-capturing data generated from an output signal of the image sensor into visible color space image data, the invisible wavelength information defining a virtual color space; and
   an image processor configured to relate the invisible wavelength information that defines the virtual color space to the image-capturing data.

2. The image-capturing device according to claim 1, comprising a plurality of bandpass filters that allow passage therethrough of mutually different parts in the continuous invisible band in the object light flux, wherein
   the controller is further configured to generate the invisible wavelength information defined based on the output characteristic determined from: wavelength bands in the invisible band that the plurality of bandpass filters allow passage therethrough; and the photosensitivity of the image sensor.

3. The image-capturing device according to claim 2, wherein the invisible wavelength information includes a plurality of invisible primary stimulus values determined from: respective peak wavelengths of the plurality of bandpass filters and half widths corresponding to the respective peak wavelengths; and the photosensitivity of the image sensor.

4. The image-capturing device according to claim 3, wherein the plurality of invisible primary stimulus values are associated with information related to mutually different regions of the visible color space.

5. The image-capturing device according to claim 4, wherein the invisible wavelength information includes information for associating the plurality of invisible primary stimulus values with visible primary stimulus values in the visible color space.

6. The image-capturing device according to claim 2, wherein the controller is further configured to generate, as the invisible wavelength information, information about a lower limit sensitivity and an upper limit sensitivity of the sensitivity characteristic in the continuous invisible band.

7. The image-capturing device according to claim 6, wherein the lower limit sensitivity is associated with a coordinate of a blue region in the visible color space, and the upper limit sensitivity is associated with a coordinate of a red region in the visible color space.

8. The image-capturing device according to claim 2, wherein the invisible wavelength information includes a reference value associated with a particular coordinate in the visible color space.

9. The image-capturing device according to claim 8, wherein the particular coordinate is a white reference coordinate.

10. The image-capturing device according to claim 8, wherein the reference value is a value within an image-capturing system color space.

11. The image-capturing device according to claim 8, wherein
    the plurality of bandpass filters are three or more bandpass filters, and
    the reference value is determined based on respective peak wavelengths of the three or more bandpass filters.

12. The image-capturing device according to claim 8, wherein the controller is further configured to set the reference value based on a spectrum of an object an image of which is captured by the image sensor.

13. The image-capturing device according to claim 12, wherein the invisible wavelength information includes information indicative of a gain by which an output signal of the image sensor is multiplied.

14. The image-capturing device according to claim 2, wherein the invisible wavelength information includes information indicative of a color gamut in which an image based on the image data is to be displayed.

15. A data generating device comprising:
    an image processor configured to acquire image-capturing data an image of which has been captured by receiving invisible band light; and
    a controller configured to generate invisible wavelength information defined based on a sensitivity characteristic, which is an output characteristic of an image sensor, to an object light flux wavelength for conversion of the image-capturing data into visible color space image data, the invisible wavelength information defining a virtual color space;
    wherein the image processor is further configured to relate the invisible wavelength information that defines the virtual color space to the image-capturing data.

16. An image processing device comprising:
    an image processor; and
    a memory having computer-readable instructions stored thereon that, when executed by the image processor, perform operations including
    acquiring invisible image-capturing data including at least three types of image-capturing elements corresponding to respective wavelength bands in an invisible band passage of which has been allowed,
    acquiring observation information which is information about an observation target, and
    relating mutually different regions in a visible color space to the respective image-capturing elements based on the observation information to generate color image data.

17. The image processing device according to claim 16, wherein the operations further include acquiring information related to a spectrum of the observation target as the observation information.

18. The image processing device according to claim 16, wherein the operations further include
    acquiring characteristics information indicative of a sensitivity characteristic, which is an output characteristic of an image sensor that has generated the invisible image-capturing data, to an object light flux wavelength, and
    relating the regions to the respective image-capturing elements based on the characteristics information.

19. The image processing device according to claim 16, wherein the operations further include relating the regions to the respective image-capturing elements based on a color difference discrimination threshold.

20. The image processing device according to claim 16, wherein the operations further comprise associating a region outside the visible color space with at least one of the image-capturing elements.

* * * * *